US009720408B2

(12) United States Patent
Ramadoss et al.

(10) Patent No.: US 9,720,408 B2
(45) Date of Patent: Aug. 1, 2017

(54) METHODS AND APPARATUS TO DETECT ROOT CAUSES OF ALARM PATTERNS IN PROCESS CONTROL SYSTEMS

(71) Applicant: FISHER-ROSEMOUNT SYSTEMS, INC, Round Rock, TX (US)

(72) Inventors: Vidya Ramadoss, Austin, TX (US); Brandon Hieb, Cedar Park, TX (US); David R. Denison, Austin, TX (US); Kim O. Van Camp, Georgetown, TX (US); Paul K. Daly, Cedar Park, TX (US); Deeann Gates DelGuzzi, Pflugerville, TX (US); Steven Lee Dienstbier, Round Rock, TX (US); Rajaraman Ramachandran, Austin, TX (US); Bruce Hubert Campney, Pflugerville, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 87 days.

(21) Appl. No.: 14/703,544

(22) Filed: May 4, 2015

(65) Prior Publication Data
US 2016/0328954 A1    Nov. 10, 2016

(51) Int. Cl.
G08B 29/00    (2006.01)
G05B 23/02    (2006.01)
G05B 19/042   (2006.01)

(52) U.S. Cl.
CPC ..... G05B 23/0278 (2013.01); G05B 19/0428 (2013.01); G05B 23/0272 (2013.01)

(58) Field of Classification Search
CPC ............ G05B 23/0272; G05B 19/0428; G05B 23/0278

(Continued)

(56) References Cited

U.S. PATENT DOCUMENTS 5,859,885 A * 1/1999 Rusnica ............. G05B 23/0272
                                                340/525
7,289,935 B1   10/2007 Hugo
(Continued)

FOREIGN PATENT DOCUMENTS

GB    2470995    12/2010
GB    2483536    3/2012
(Continued)

OTHER PUBLICATIONS

Emerson Process Management, "DeltaV™ Alarm Operations", Nov. 2014, 6 pages.
(Continued)

*Primary Examiner* — John A Tweel, Jr.
(74) *Attorney, Agent, or Firm* — Hanley, Flight & Zimmerman, LLC

(57) ABSTRACT

Methods and apparatus to detect root causes of alarm patterns in process control systems are disclosed. An example method includes retrieving process control data generated in a process control system during a historical period of time. The process control data includes alarm data associated with alarms activated during the historical period of time. The example method also includes generating an alarm activation timeline for the historical period of time. The alarm activation timeline includes icons representative of the alarms to visually represent a temporal relationship of activation of the alarms, where one of the icons is representative of an alarm that is no longer active. The example method further includes storing the alarm activation timeline in a database.

20 Claims, 12 Drawing Sheets

(58) Field of Classification Search
USPC ..................................... 340/506, 507, 691.6
See application file for complete search history.

(56) References Cited

U.S. PATENT DOCUMENTS

| | | |
|---|---|---|
| 8,032,621 B1 | 10/2011 | Upalekar |
| 8,269,620 B2 | 9/2012 | Bullemer et al. |
| 8,779,916 B2 | 7/2014 | Van Camp et al. |
| 2009/0125825 A1 | 5/2009 | Rye et al. |
| 2010/0156654 A1 | 6/2010 | Bullemer et al. |
| 2010/0156655 A1 | 6/2010 | Bullemer et al. |
| 2012/0083917 A1 | 4/2012 | Zhou et al. |
| 2016/0266752 A1* | 9/2016 | Wu .................. G06F 17/30864 |

FOREIGN PATENT DOCUMENTS

| | | |
|---|---|---|
| GB | 2496279 | 5/2013 |
| WO | 0102919 | 1/2001 |
| WO | 2013003165 | 1/2013 |

OTHER PUBLICATIONS

Intellectual Property Office of the United Kingdom, "Search Report," issued in connection with United Kingdom Patent Application No. GB1607761.2, dated Nov. 4, 2016, 4 pages.

\* cited by examiner

METHODS AND APPARATUS TO DETECT ROOT CAUSES OF ALARM PATTERNS IN PROCESS CONTROL SYSTEMS

FIELD OF THE DISCLOSURE

This disclosure relates generally to process control systems and, more particularly, to methods and apparatus to detect root causes of alarm patterns in process control systems.

BACKGROUND

Process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices and then process this information to generate control signals to implement control routines, to make other process control decisions, and to initiate process control system alarms.

Information from the field devices and/or the controller is usually made available over a data highway or communication network to one or more other hardware devices, such as operator workstations, personal computers, data historians, report generators, centralized databases, etc. Such devices are typically located in control rooms and/or other locations remotely situated relative to the harsher plant environment. These hardware devices, for example, run applications that enable an operator to perform any of a variety of functions with respect to the process of a process control system, such as viewing the current state of the process, changing an operating state, changing settings of a process control routine, modifying the operation of the process controllers and/or the field devices, viewing alarms generated by field devices and/or process controllers, simulating the operation of the process for the purpose of training personnel and/or evaluating the process, etc.

These hardware devices typically include one or more operator interface displays to display pertinent information regarding the operating state(s) of the control system(s) and/or the devices within the control system. Example displays take the form of alarm displays that receive and/or display alarms generated by controllers or devices within the process control system, control displays that indicate the operating state(s) of the controller(s) and other device(s) within the process control system, etc.

In a process control system it is common for thousands of alarms to be defined within the process control system to notify operators of the process control system of potential problems. Alarms are defined, for example, to protect people and/or equipment, to avoid environmental incidents, and/or to ensure product quality during production. Each alarm is typically defined by one or more settings (e.g., an alarm limit) that define when a problem has occurred and/or trigger the alarm, and a priority (e.g., critical or warning) to define the importance of the alarm relative to other alarms.

Typically, alarms are presented (e.g., displayed) to operators in list or tabular format. In such formats, each alarm is presented as a single line in the list with specific data that may be relevant to inform an operator of the state of the control system. Data provided in an alarm list may include, for example, a description of the alarm, the time the alarm was triggered, the source of the alarm, the importance or priority of the alarm, the state of the alarm (e.g., acknowledged or not, active or not), the parameter that triggered the alarm, the value of the parameter, etc. As information is received from process controllers and/or field devices, the alarm list data may be updated in real time to allow the operators access to current information regarding all active alarms.

SUMMARY

Methods and apparatus to detect root causes of alarm patterns in process control systems are disclosed. An example method includes retrieving process control data generated in a process control system during a historical period of time. The process control data includes alarm data associated with alarms activated during the historical period of time. The example method also includes generating an alarm activation timeline for the historical period of time. The alarm activation timeline includes icons representative of the alarms to visually represent a temporal relationship of activation of the alarms. One of the icons is representative of an alarm that is no longer active. The example method further includes storing the alarm activation timeline in a database.

An example apparatus includes an alarm activation timeline generator to retrieve process control data generated in a process control system during a historical period of time. The process control data includes alarm data associated with alarms activated during the historical period of time. The alarm activation timeline generator is also to generate an alarm activation timeline for the historical period of time. The alarm activation timeline includes icons representative of the alarms to visually represent a temporal relationship of activation of the alarms. One of the icons is representative of an alarm that is no longer active. The example apparatus further includes an alarm activation timeline database to store the alarm activation timeline.

An example tangible computer readable storage medium comprising instructions that, when executed, cause a machine to retrieve process control data generated in a process control system during a historical period of time. The process control data includes alarm data associated with alarms activated during the historical period of time. The instructions further cause the machine to generate an alarm activation timeline for the historical period of time. The alarm activation timeline includes icons representative of the alarms to visually represent a temporal relationship of activation of the alarms. One of the icons is representative of an alarm that is no longer active. The instructions further cause the machine to store the alarm activation timeline in a database.

DETAILED DESCRIPTION

Figure 1:
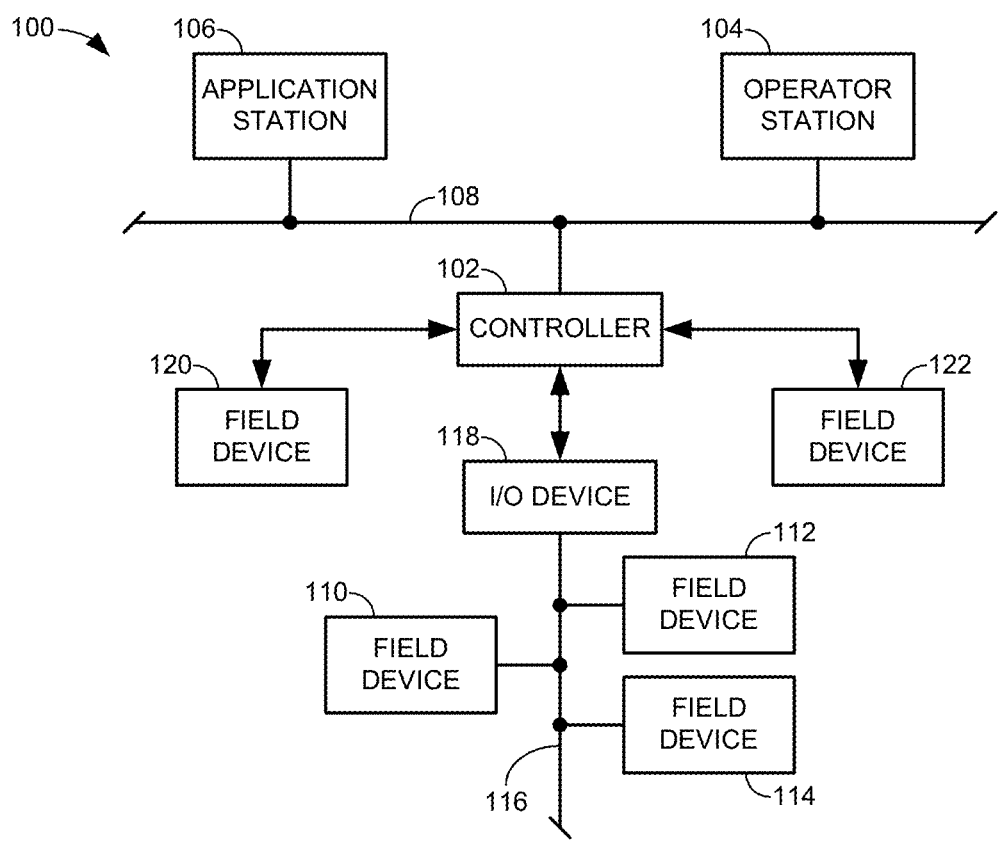
FIG. 1 is a schematic illustration of an example process control system.

It is not uncommon for process control system operators to be faced with multiple alarms at any given moment. While an operator may be able to manage up to five or ten alarms in a ten minute period, exceeding that rate of alarms can overwhelm the operator. When many alarms are triggered in a small timeframe, commonly referred to as an alarm flood, the resulting amount of information may exceed an operator's capacity to analyze and respond effectively to the alarms.

Additionally, because alarms are typically presented in list format, the operator is unlikely to grasp the entire situation quickly. For example, the number of alarms may exceed the vertical space provided for the alarm list, thereby requiring the operator to scroll through the list or otherwise sort and/or filter the alarm list to review all the alarms. This task is often complicated by the fact that alarm data is typically updated in real time. Thus, if an alarm clears or changes state, or additional alarms are triggered, the operator may miss one or more of these changes. The only way to avoid this is for the operator to repeatedly and frequently reread the list of alarm information, thereby sacrificing precious time to address the alarm flood and potentially significant process control system failures associated therewith (e.g., by avoiding costly and/or dangerous consequences of the failure).

Furthermore, it is common for a particular circumstance and/or state of a process control system to result in a cascade of predictable alarms, often being tripped in a predictable order. The initial circumstance and/or state of the process control system that causes such a series of alarms is referred to as a root cause. The faster operators are able to identify a root cause of an alarm flood, the faster they are able to take necessary actions to correct any errors, thereby minimizing the effects of a process control system failure. As such, special operator training may be required for predetermined high-consequence abnormal process conditions, where operators are expected to recognize expected alarm activation patterns (e.g., order of occurrence and spacing). However, operators, equipped only with an alarm list that is sorted and/or filtered while the data itself is changing, are unlikely to recognize the relationships of the alarms to identify the common patterns and root causes.

Sometimes operators may be assisted in recognizing, appreciating, and/or responding to alarm floods and/or other alarm patterns through the use of alarm timelines that graphically indicate an overall state of a process control system by populating the timelines with icons representing each of the alarms currently active in the process control system. Some such example timelines are shown and described in U.S. Pat. No. 8,779,916, which is hereby incorporated herein by reference in its entirety.

In the process of responding to alarm floods, an operator may gain insights into how to respond to such alarm patterns that may be beneficial for future reference by the same operator and/or different operators (e.g., an operator in a following shift or a new operator being trained) should the same or similar pattern of alarms (e.g., an alarm flood) occur again. However, as the operator takes corrective actions to resolve alarms within the alarm flood, the alarms will clear so as to no longer be active and, thus, will no longer be represented by corresponding icons within a graphic timeline of active alarms. As a result, the complete pattern of alarms activated during an alarm flood is unlikely to be represented within the timeline by the time the alarm flood has concluded and/or passed and the pattern of alarms (e.g., represented in a visual timeline) will not be available for recall. As such, reviewing the timeline of active alarms after the alarm flood has passed is insufficient to enable a user to evaluate the effectiveness of response actions taken, review or consider alternate response options, inform other operators of what occurred, and/or train other operators to respond to similar alarm floods.

Accordingly, in the examples disclosed herein, visual timelines of particular alarm floods and/or other alarm patterns occurring during a specified period of time may be saved in a database of historical alarm patterns. In some examples, these historical timelines include icons corresponding to all alarms activated during the relevant period of time. That is, while timelines representing live data (based on substantially real-time updates) typically only display icons for active alarms, example historical alarm timelines include icons representing the activation of every alarm during the relevant period including, for example, alarms that have been resolved (e.g., through operator action) or otherwise cleared (e.g., a fleeting alarm). In this manner, the entire sequence of alarms activated during the period of interest may be saved and recalled for subsequent reference. For purposes of explanation, a timeline representing only active alarms that is updated using substantially real-time data (e.g., based on live data) is herein referred to as an active alarm timeline. By contrast, a timeline representing previously activated alarms (whether still active or not) based on historical data (e.g., other than live data) is herein referred to as an alarm activation timeline.

In some examples, an alarm activation timeline includes data associated with control actions taken by an operator during the relevant period. In some examples, the alarm activation timeline includes icons representative of such control actions. Additionally or alternatively, in some examples, the operator and/or other plant personnel may add annotations, remarks, or comments to the alarm activation timeline further explaining the nature of the saved alarm pattern, the particular actions taken and/or the reasoning behind such actions, insights into potential alternative response strategies, and so forth.

In some examples, alarm activation timelines previously saved in a database may be recalled for comparison to a presently occurring pattern of alarms based on live alarm data (e.g., data from the process control system being updated in substantially real-time). For example, as an operator is faced with a particular pattern of alarms presented in an active alarm timeline, the operator may request the retrieval of alarm activation timelines from the database that exhibit the same or similar alarm pattern for reference.

In some examples, each timeline of historically activated alarms (e.g., alarm activation timelines) stored in the database is compared with the real-time timeline (e.g., active alarm timeline) using a pattern matching algorithm. In some such examples, each alarm activation timeline is given a score based on the degree of similarity of the corresponding alarms with the alarms in the active alarm timeline to assist an operator in identifying the most relevant alarm activation timelines. In some examples, the operator may use the stored alarm activation timeline (and any associated annotations or remarks) as a guide or reference in responding to the pattern of alarms the operator is currently addressing. In some examples, operators may be too busy taking corrective actions addressing an alarm flood to review an alarm activation timeline of a similar flood at that moment. However, once the alarm flood is under control, operators may compare their actions to those stored in alarm activation timelines of similar floods to determine whether any difference in the corrective actions of each resulted in different impacts on how quickly the alarm floods were resolved. Additionally or alternatively, the similarity score may determine whether the operator decides to store an alarm flood just addressed as a new alarm activation timeline for subsequent reference. For example, if there is already an alarm flood stored in the database similar to a flood just experienced by an operator, the operator may determine that there is no need to store a second timeline representative of the alarm flood just experienced. Instead, the operator may add any remarks or comments to the previously saved timeline for future reference. In other examples, operators may decide to save a new alarm activation timeline even when a similar alarm activation timeline already exists so that any differences can be compared and analyzed.

In some examples, as operators respond to alarm floods represented in an active alarm timeline, they may desire to review alarms that have already exited view (e.g., alarms that have cleared based on control actions already taken). Accordingly, in some examples, operators can toggle between a live view of active alarms during a most recent period of time and a historical view of all alarms activated during the same period of time. That is, in some examples, independent of any database of alarm activation timelines, operators may toggle between a display of an active alarm timeline (based on real-time alarm data) and a historical alarm activation timeline (i.e., not actively updated and showing cleared alarms) for the same time span.

FIG. 1 is a schematic illustration of an example process control system 100. The example process control system 100 of FIG. 1 includes one or more process controllers (one of which is designated at reference numeral 102), one or more operator stations (one of which is designated at reference numeral 104), and one or more workstations (one of which is designated at reference numeral 106). The example process controller 102, the example operator station 104 and the example workstation 106 are communicatively coupled via a bus and/or local area network (LAN) 108, which is commonly referred to as an application control network (ACN).

The example operator station 104 of FIG. 1 allows an operator to review and/or operate one or more operator display screens and/or applications that enable the operator to view process control system variables, view process control system states, view process control system conditions, view process control system alarms, and/or change process control system settings (e.g., set points, operating states, clear alarms, silence alarms, etc.). An example manner of implementing the example operator station 104 of FIG. 1 is described below in connection with FIG. 2.

The example operator station 104 includes and/or implements an alarm presentation interface (e.g., the example alarm presentation interface 300 of FIGS. 3-6) to graphically display active alarms in an active alarm timeline to allow process control system operators to visually perceive the temporal relationships of the alarms. The alarm presentation interface also displays alarm activation timelines that graphically represent all alarms activated during a historical period of time. In some examples, the historical period of time includes a most recent or current period of time (e.g., the time between a past point in time and the present time). In some examples, the most recent period of time for the alarm activation timeline corresponds to the period of time represented in an active alarm timeline. In some examples, the operator station 104 of FIG. 1 enables the storage of an activation alarm timeline in memory to be recalled for reference, training, and/or subsequent analysis.

The example workstation 106 of FIG. 1 may be configured as an application station to perform one or more information technology applications, user-interactive applications and/or communication applications. For example, the application station 106 may be configured to perform primarily process control-related applications, while another application station (not shown) may be configured to perform primarily communication applications that enable the process control system 100 to communicate with other devices or systems using any desired communication media (e.g., wireless, hardwired, etc.) and protocols (e.g., HTTP, SOAP, etc.). The example operator station 104 and the example workstation 106 of FIG. 1 may be implemented using one or more workstations and/or any other suitable computer systems and/or processing systems. For example, the operator station 104 and/or workstation 106 could be implemented using single processor personal computers, single or multi-processor workstations, etc.

The example LAN 108 of FIG. 1 may be implemented using any desired communication medium and protocol. For example, the example LAN 108 may be based on a hardwired and/or wireless Ethernet communication scheme. However, any other suitable communication medium(s) and/or protocol(s) could be used. Further, although a single LAN 108 is illustrated in FIG. 1, more than one LAN and/or other alternative communication hardware may be used to provide redundant communication paths between the example systems of FIG. 1.

The example controller 102 of FIG. 1 is coupled to a plurality of smart field devices 110, 112 and 114 via a digital data bus 116 and an input/output (I/O) gateway 118. The smart field devices 110, 112, and 114 may be Fieldbus compliant valves, actuators, sensors, etc., in which case the smart field devices 110, 112, and 114 communicate via the digital data bus 116 using the well-known Foundation Fieldbus protocol. Of course, other types of smart field devices and communication protocols could be used instead. For example, the smart field devices 110, 112, and 114 could instead be Profibus and/or HART compliant devices that communicate via the data bus 116 using the well-known Profibus and HART communication protocols. Additional I/O devices (similar and/or identical to the I/O gateway 118) may be coupled to the controller 102 to enable additional groups of smart field devices, which may be Foundation Fieldbus devices, HART devices, etc., to communicate with the controller 102.

In addition to the example smart field devices 110, 112, and 114, one or more non-smart field devices 120 and 122 may be communicatively coupled to the example controller 102. The example non-smart field devices 120 and 122 of FIG. 1 may be, for example, conventional 4-20 milliamp (mA) or 0-10 volts direct current (VDC) devices that communicate with the controller 102 via respective hardwired links.

The example controller 102 of FIG. 1 may be, for example, a DeltaV™ controller sold by Fisher-Rosemount Systems, Inc., an Emerson Process Management company. However, any other controller could be used instead. Further, while only one controller 102 is shown in FIG. 1, additional controllers and/or process control platforms of any desired type and/or combination of types could be coupled to the LAN 108. In any case, the example controller 102 performs one or more process control routines associated with the process control system 100 that have been generated by a system engineer and/or other system operator using the operator station 104 and which have been downloaded to and/or instantiated in the controller 102.

While FIG. 1 illustrates an example process control system 100 within which the methods and apparatus to control information presented to process control system operators and/or other personnel described in greater detail below may be advantageously employed, persons of ordinary skill in the art will readily appreciate that the methods and apparatus to control information presented to operators and/or other personnel described herein may, if desired, be advantageously employed in other process plants and/or process control systems of greater or less complexity (e.g., having more than one controller, across more than one geographic location, etc.) than the illustrated example of FIG. 1.

Figure 2:
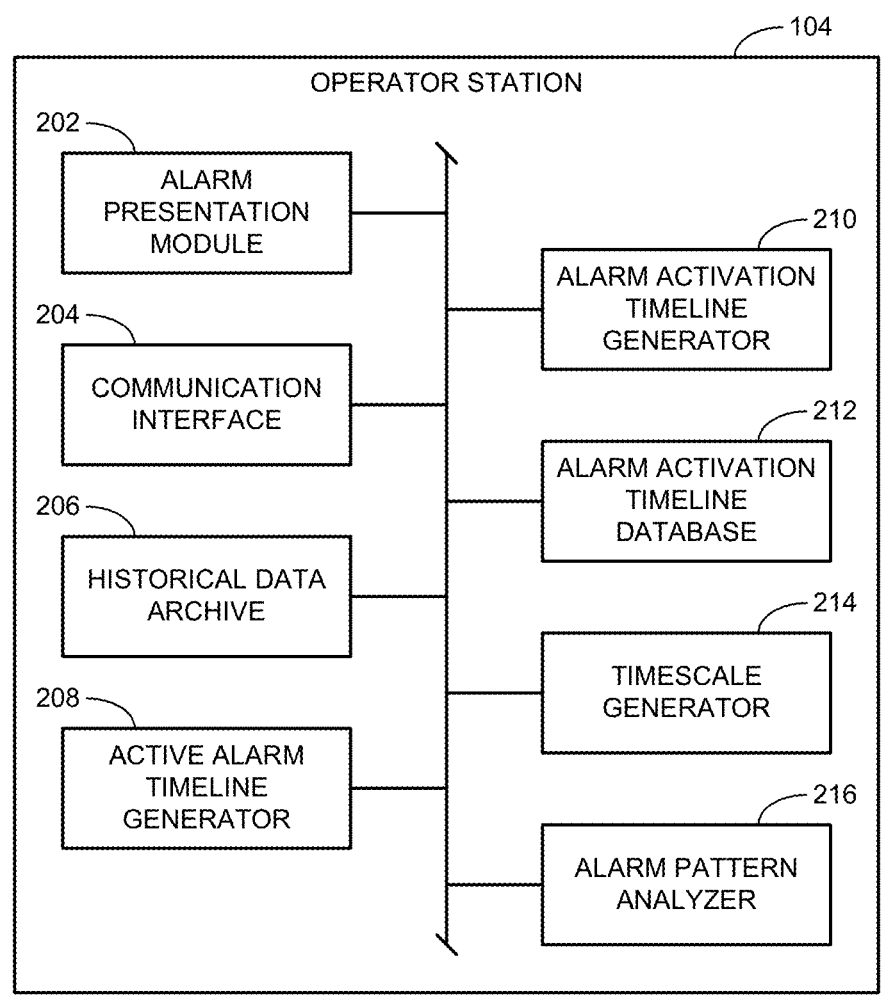
FIG. 2 illustrates an example manner of implementing the example operator station of FIG. 1.

FIG. 2 illustrates an example manner of implementing the example operator station 104 of FIG. 1. The example operator station 104 of FIG. 2 includes an example alarm presentation module 202, an example communication interface 204, an example historical data archive 206, an example active alarm timeline generator 208, an example alarm activation timeline generator 210, an example alarm activation timeline database 212, an example timescale generator 214, and an example alarm pattern analyzer 216.

To allow an operator and/or other user to interact with the example operator station 104 of FIG. 2, the example operator station 104 includes the example alarm presentation module 202. In the illustrated example, the alarm presentation module 202 provides data to a display to graphically represent relevant information to an operator. In some examples, the data includes user interfaces such as the alarm presentation interfaces shown and described in connection with FIGS. 3-6. Further, in some examples, the alarm presentation module 202 receives inputs provided by the operator and/or other user of the operator station 104 interacting with the user interfaces output to the display.

The example operator station 104 of FIG. 2 is provided with the example communication interface 204 to communicate with other components in the process control system 100 of FIG. 1. For example, commands provided by an operator may be transmitted to the controller 102 and, thus, to the field devices 110, 112, 114, 120, 122 via the communication interface 204. Additionally, the communication interface 204 may monitor other components in the process control system 100 to receive associated data. In some examples, the received data includes alarm data received via the controller 102 indicative of the state of alarms in the process control system 100 and associated metadata associated with the alarms. The alarm data may include, for example, descriptions of alarms, times the alarms were triggered, sources of the alarms, importance or priority of the alarms, states of the alarms (e.g., acknowledged or not, active or not), parameters that triggered the alarms, values of the parameters, etc. In some examples, the alarm data is updated in substantially real-time and presented to an operator via the alarm presentation module 202 (e.g., within an alarm list and/or an alarm timeline). Additionally, in some examples, as the alarm data is received via the communication interface 204, the alarm data is stored in the historical data archive 206 for later retrieval and/or analysis. Further, in some examples, the historical data archive 206 also stores operator control data indicative of control actions taken by operators and/or other personnel. The operator control data may include, for example, the nature of control actions, the time of such actions, parameters affected by such actions, etc. The collected alarm data, operator control data, and/or any other relevant data generated by the process control system 100 stored in the historical data archive 206 are collectively referred to herein as process control data.

Although the historical data archive 206 is shown as part of the operator station 104, in some examples, a historical archive of process control data is maintained apart from the operator station 104. In some examples, a local historical data archive 206 and a separate historical data archive are implemented.

In the illustrated example of FIG. 2, the operator station 104 is provided with the example active alarm timeline generator 208 to generate active alarm timelines. As described above, an active alarm timeline refers to a timeline that visually represents the temporal relationship of the initial occurrence, onset, or activation of alarms that are still active within a process control system at a current point in time. In some examples, the active alarm timeline may be limited to a specific time span such that the temporal relationship of alarms activated outside of the specified time span, though still active, are not represented in the timeline. In some such examples, an indication of the number of active alarms outside the time span may nevertheless be provided in conjunction with the timeline.

In some examples, an active alarm timeline is generated based on real-time alarm data (e.g., process control data updated in substantially real-time) obtained via the communication interface 204 from components in the process control system 100 of FIG. 1. In some examples, each active alarm in the process control system 100 is represented by a corresponding icon within the active alarm timeline. As alarms are cleared and become inactive (e.g., resolved via corrective actions taken by an operator), the corresponding icons in an active alarm timeline disappear because such alarms are no longer active. Further, in some examples, an active alarm timeline includes icons representative of control actions taken by operators to indicate the temporal relationship of the alarms and the control actions. An example active alarm timeline is shown and described in greater detail below in connection with FIG. 3.

In the illustrated example of FIG. 2, the operator station 104 is provided with the example alarm activation timeline generator 210 to generate alarm activation timelines. As described above, an alarm activation timeline refers to a timeline that visually represents the temporal relationship of the activation of alarms within a process control system during a historical period of time regardless of whether the alarms are still active in the present. That is, in some examples, an alarm activation timeline includes icons representative of active alarms (as in an active alarm timeline) as well as alarms that have been cleared or resolved by an operator (not represented in an active alarm timeline). Additionally, in some examples, alarm activation timelines include icons representative of fleeting alarms that are triggered and then cleared soon thereafter without operator action (e.g., a parameter value momentarily exceeds a set point but returns to a normal range without operator intervention). In some examples, the alarm activation timelines include icons representative of a chattering alarm that is repeatedly triggered and cleared (e.g., where a parameter value is very close to a set point and variability in the system causes frequent triggering of the alarm). In some such examples, a separate icon is provided for each time the chattering alarm is triggered to indicate the timing of each activation of the alarm. Further, in some examples, the alarm activation timelines include icons representative of suppressed and/or shelved alarms. In some examples, one or more types of alarms (e.g., chattering alarms, fleeting alarms, suppressed or shelved alarms, auto-acknowledged alarms, etc.) may be filtered or removed from a rendering of an alarm activation timeline.

As alarm activation timelines may include previously activated alarms that may have cleared (i.e., are no longer active), in some examples, the active alarm timelines are generated based on historical alarm data retrieved from the historical data archive 206 corresponding to a historical period of time. Additionally, in some examples, alarm activation timelines include icons representative of control actions taken by the operator during the historical period of time to indicate the temporal relationship of the alarms and the control actions. In some examples, the historical period of time for an alarm activation timeline may correspond to the time span associated with an active alarm timeline currently being viewed by an operator. In this manner, the operator may toggle between views of the active alarm timeline and the alarm activation timeline to visually compare what alarms are currently active relative to what alarms have already been cleared. In other examples, the historical period of time may be some other period of time designated by an operator. In some examples, an operator or other user may desire to store an alarm activation timeline for a particular historical period of time for later reference. For example, the particular historical period of time may correspond to an alarm flood or other pattern of alarms that the operator or other user desires to review to determine and/or improve the effectiveness of the operator's response strategy. Accordingly, in some examples, an operator may designate the particular period of time for an alarm activation timeline and save the timeline in the example alarm activation timeline database 212.

Example alarm activation timelines are shown and described in greater detail below in connection with FIGS. 4 and 6. Further, the designation of a particular historical period of time for an alarm activation timeline to be stored in the alarm activation timeline database 212 is shown and described in greater detail below in connection with FIG. 5.

In the illustrated example of FIG. 2, the operator station 104 is provided with the example timescale generator 214 to generate timescales suitable for displaying the active alarm timelines and/or the alarm activation timelines based on user selected inputs. In some examples, a user may select a base incremental unit of time for the timescale from which the amount of time represented within a particular rendering of an alarm timeline may be determined. For example, the user may select a base time increment defining how specifically (e.g., the level of granularity with which) the temporal relationships of the alarms are to be represented. In some such examples, icons representative of all alarms activated during the same incremental unit of time are visually grouped in the alarm timelines to indicate the corresponding alarms occurred within the same incremental time interval. In some examples, the base incremental units of time that may be selected by a user correspond to commonly used and/or intuitive time divisions (e.g., 1 second, 5 seconds, 15 seconds, 30 seconds, 1 minute, 5 minutes, 10 minutes, 15 minutes, 30 minutes, 1 hour, 2 hours, 4 hours, 8 hours, 12 hours, 1 day, etc.). Thus, if three alarms are successively activated at 12:13:32 PM, 12:14:26 PM, and 12:15:56 PM and the user selects the base incremental unit of 1 minute, each of the three alarms is represented as occurring during different time intervals corresponding to each minute between 12:13 PM and 12:16 PM. In some examples, if the user selected 5 minutes as the base incremental unit of time, the first two alarms are grouped in the time period between 12:10 PM and 12:15 PM, whereas the third alarm is represented in the following 5 minute time increment (12:15 PM to 12:20 PM). Further, if the user selected a 30 minute incremental unit of time as the base time increment in the above example, all of the alarms are represented as occurring in the same incremental unit of time displayed in the timeline (e.g., between 12:00 PM and 12:30 PM).

In some examples, the timescale provided with each alarm timeline includes markings (e.g., hash marks) indicative of each base incremental unit of time selected by the user. In some examples, the spacing between such markings on the timescale (e.g., the width provided for each base time increment) is a fixed distance regardless of the base incremental unit of time selected. In some examples, the fixed distance is defined based on the width (e.g., in number of pixels) used to display each of the alarm icons to be rendered in an alarm timeline. For example, the alarm icons may be 20 pixels wide such that the width provided for each incremental unit of time on the timescale is also 20 pixels. In some examples, the pixel-width of the base unit of time is slightly larger than the pixel-width of the alarm icons (e.g., 22 pixels, 24 pixels, etc.) to provide passing or space between alarm icons in adjacent time intervals. In some such examples, with the pixel-width base unit of time being approximately equal to the pixel-width of the alarm icons, all alarms activated within the same unit of time are represented within an alarm timeline by alarm icons in a vertical column (e.g., graphically stacked on top of each other) in alignment with the unit of time indicated in the timescale during which the corresponding alarms occurred. In some examples, the ordering of the alarm icons within the vertical stack for a single incremental unit of time are ordered based on the timing of the alarms within the incremental unit of time. Although the pixel-width of a base unit of time is described as corresponding to a single column of alarm icons in the above example, in other examples, the pixel width of the base unit of time may be any other suitable width (e.g., sufficient to include two columns of alarm icons).

In some examples, as the base incremental unit of time designated for a timescale of an alarm timeline increases, the number of alarms occurring within the base incremental unit of time tends to increase and the alarm timeline tends to include taller columns of alarm icons. Conversely, if an operator decreases the base incremental unit of time, the alarm icons tend to be distributed over multiple smaller time intervals such that fewer alarms are displayed (e.g., stacked) within any particular interval. In this manner, an operator can quickly gain a sense of the temporal relationship of all alarms at varying levels of granularity without the concern that the associated alarm icons will overlap or otherwise becoming overly condensed and difficult to recognize.

In some examples, a fixed width for represented time intervals that can correspond to different base incremental units of time results in a different length of time (e.g., time span) for a timescale having a fixed overall width. That is, if a particular timeline represents alarms occurring over a one hour period with a base incremental unit of 1 minute (for a total of 60 time intervals along the timescale), altering the base incremental unit of time to 5 minutes results in a total duration of the timescale increasing to five hours. In some examples, the timescale generator 214 determines the particular duration for the overall timescale based on the pixel-width of the entire space provided for the alarm timeline divided by the base incremental unit of time. Further, in some examples, the timescale generator 214 determines the particular marking and labeling of the timescale to be used based on the designated base unit of time. For example, if the timescale extends for a full hour with a base incremental unit of 1 minute, the example timescale generator 214 may add labeled markers at 15 minute intervals (4 intervals to the hour). In other examples, the example timescale generator 214 may add labeled markers at 10 minute intervals (6 intervals to the hour). If a user changes the timescale to a base unit of 5 minutes for a total timescale length of five hours, the labeled intervals in either of the above examples may be confusing to the user (e.g., 4 intervals would correspond to 75 minutes each and 6 intervals would correspond to 50 minutes each). Thus, in some examples, the timescale generator 214 updates the timescale to label markers at one hour intervals (5 intervals to the five hour timescale) or half hour intervals (10 intervals to the five hour timescale). In this manner, operators and/or other users reviewing alarms at different temporal granularities can quickly understand the temporal relationships of the alarms based on intuitive markings and labels for the timescale. Example alarm timelines with different example timescales are shown and described in greater detail below in connection with FIGS. 3-8. Although the example timescale generator 214 has been described independently above, in some examples, the timescale generator 214 and/or the associated functionality are incorporated into each of the active alarm timeline generator 208 and the alarm activation timeline generator 210. Further, while the timescale generator 214 is disclosed herein in the context of generating alarm timelines, the timescale generator 214 may be implemented to automatically arrange the timescale (e.g., markings and/or labels) for any type of graphic that includes a time axis.

In the illustrated example of FIG. 2, the operator station 104 is also provided with the example alarm pattern analyzer 216 to compare different alarm timelines for similarities in the patterns of alarms represented therein. In some examples, an active alarm timeline may be compared to multiple different alarm activation timelines of different historical periods of time stored in the alarm activation timeline database 212. As the active alarm timeline may have already cleared a number of alarms, in some such examples, an alarm activation timeline for the time span associated with the active alarm timeline is compared with the stored alarm activation timelines. In such examples, each stored alarm activation timeline may be scored based on the degree of similarity with the active alarm timeline (or similarity to the alarm activation timeline corresponding to the active alarm timeline). In this way, an operator can identify whether any previously stored alarm activation timelines are similar to a pattern of alarms the operator is currently addressing and which stored alarm activation timeline is most relevant. Additionally or alternatively, in some examples, different stored alarm activation timelines corresponding to different historical periods of time may be compared to each other to assist in identifying recurring root causes of alarm floods and/or to compare the effectiveness of different response sequences taken by operators during similar alarm floods and/or other patterns of alarms.

In some examples, the alarm pattern analyzer 216 uses any suitable pattern matching algorithm to compare two timelines and assign a score or value (e.g., between 1 and 100) indicative of the degree of similarity between the timelines. The factors used in the comparison and corresponding complexity of the algorithm in comparing the timelines may depend on the desired degree of accuracy. For instance, a relatively simple comparison may be based purely on the number of alarms activated in each timeline that are common with the alarms activated in the other timeline (e.g., two timelines with 14 common alarms are given a higher score (more similar) than two timelines with only 11 common alarms). In some examples, the number of uncommon alarms relative to the number of common alarms may be taken into account (e.g., although 14 alarms are common there may be 8 unique alarms activated in one timeline and 5 unique alarms activated in the other indicating dissimilarity between the timelines). In some examples, the order or sequencing of the alarms may be compared in addition to the number of common alarms between two timelines. Additionally or alternatively, in some examples, the particular timing and/or temporal spacing of the alarms may be taken into account. In some examples, the control actions and/or the timing of the control actions may also be considered in comparing the two timelines.

While an example manner of implementing the operator station 104 of FIG. 1 is illustrated in FIG. 2, one or more of the elements, processes and/or devices illustrated in FIG. 2 may be combined, divided, re-arranged, omitted, eliminated and/or implemented in any other way. Further, the example alarm presentation module 202, the example communication interface 204, the example historical data archive 206, the example active alarm timeline generator 208, the example alarm activation timeline generator 210, the example alarm activation timeline database 212, the example timescale generator 214, the example alarm pattern analyzer 216, and/or, more generally, the example operator station 104 of FIG. 2 may be implemented by hardware, software, firmware and/or any combination of hardware, software and/or firmware. Thus, for example, any of the example alarm presentation module 202, the example communication interface 204, the example historical data archive 206, the example active alarm timeline generator 208, the example alarm activation timeline generator 210, the example alarm activation timeline database 212, the example timescale generator 214, the example alarm pattern analyzer 216, and/or, more generally, the example operator station 104 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example alarm presentation module 202, the example communication interface 204, the example historical data archive 206, the example active alarm timeline generator 208, the example alarm activation timeline generator 210, the example alarm activation timeline database 212, the example timescale generator 214, and/or the example alarm pattern analyzer 216 is/are hereby expressly defined to include a tangible computer readable storage device or storage disk such as a memory, a digital versatile disk (DVD), a compact disk (CD), a Blu-ray disk, etc. storing the software and/or firmware. Further still, the example operator station 104 of FIG. 1 may include one or more elements, processes and/or devices in addition to, or instead of, those illustrated in FIG. 2, and/or may include more than one of any or all of the illustrated elements, processes and devices.

Figure 3:
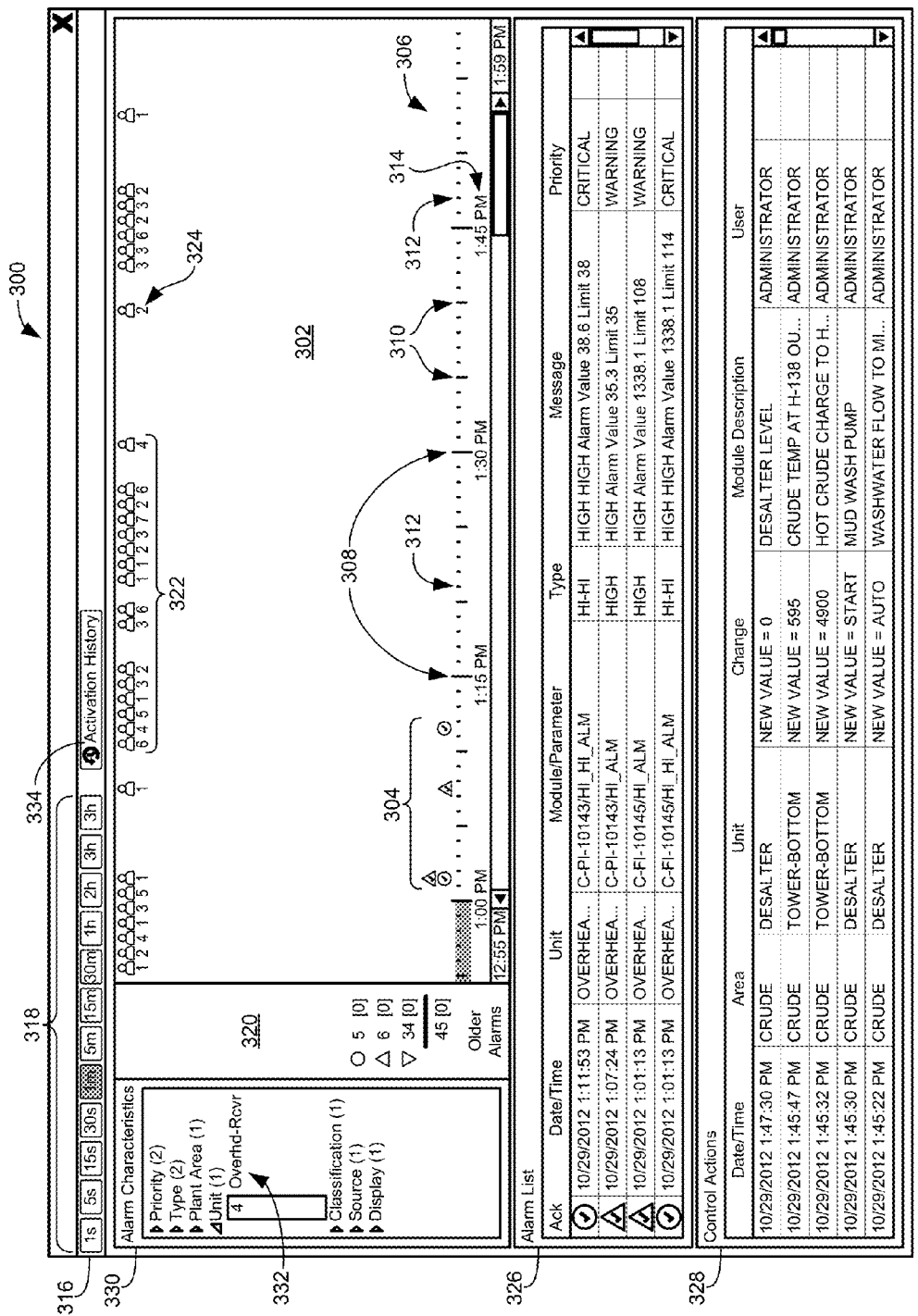
FIG. 3 illustrates an example alarm presentation interface generated by the example operator station of FIGS. 1 and/or 2 displaying an example active alarm timeline.

FIG. 3 illustrates an example alarm presentation interface 300 generated by the example operator station 104 of FIGS. 1 and/or 2 with an example active alarm timeline 302. In the illustrated example, the active alarm timeline 302 includes active alarm icons 304 to graphically represent the temporal relationship of active alarms within the process control system 100 during a time span for the timeline 302. As shown in the illustrated example, the active alarm icons 304 are different shapes to indicate different priorities (e.g., warning vs. critical) and/or other characteristics of the alarms. Additionally or alternatively, the icons 304 may be different colors to distinguish alarm characteristics. In some examples, as shown in FIG. 3, the icons 304 include check marks indicating that an operator has acknowledged the corresponding alarms.

In the illustrated example, each icon 304 is located along a timescale 306 at a position corresponding to the time when the associated alarm was triggered or activated. More particularly, in the illustrated example, the icons 304 are located between markings representative of a base incremental unit of time for the timescale 306 selected by a user. That is, the alarm icons 304 graphically aligned with each incremental time interval are representative of alarms that were activated during the corresponding time interval. In some examples, if more than one alarm was activated during the same time interval, the corresponding alarms are grouped and stacked on top of each other in a single column above the timescale 306 between minor hash marks 312 demarcating the incremental period of time during which the alarms were activated. As shown in the illustrated example, two active alarms were activated between 1:01 PM and 1:02 PM (both at 1:01:13 PM as indicated in an alarm list 326 described below), another active alarm was activated between 1:07 PM and 1:08 PM (at 1:07:24 PM), and a fourth active alarm was activated between 1:11 PM and 1:12 PM (at 1:11:53 PM). Thus, two active alarm icons 304 are shown grouped or stacked in the same time interval corresponding to the incremental unit of time between 1:01 and 1:02 PM and one active alarm icon is represented in each incremental time interval beginning at 1:07 PM and 1:11 PM respectively. In some examples, the ordering of the alarm icons when stacked in a single grouping or column (e.g., a single base incremental unit of time) corresponds to the order in which the alarms occurred within the associated time interval (e.g., the older alarms are on top with the newest alarms on the bottom).

In the illustrated example, the timescale 306 includes major hash marks 308, intermediate hash marks 310, and the minor hash marks 312. In some examples, the major hash marks 308 are associated with corresponding time labels 314 indicating the time represented by the major hash marks 308. In some examples, the time between each major hash mark and the corresponding labels 314 are automatically set or adjusted to commonly used or intuitive time divisions appropriate for the total time span of the timescale 306. For instance, as shown in the illustrated example, the major time divisions (corresponding to the major hash marks 308) extend for 15 minutes or a quarter hour, which is much easier for an operator to intuitively understand than if the divisions were labeled every 13 minutes. In some examples, if the timescale 306 is changed to be a longer or shorter period, the time divisions of the major hash marks 308 and corresponding labels 314 are automatically updated. In some examples, a commonly used or intuitive time division corresponds to an evenly divided portion of a minute, an hour, a half day (e.g., 12 hours), or a full day (e.g., 24 hours). More particularly, in some examples, commonly used time divisions are those divisions that people may naturally use when referring to time. Some commonly used or intuitive time divisions include 1 second, 5 seconds, 10 seconds, 15 seconds, 30 seconds, 1 minute, 5 minutes, 10 minutes, 15 minutes, 30 minutes, 1 hour, 3 hours, 4, hours, 6 hours, 8 hours, and 12 hours but other time divisions may also be used. Additionally, as shown in the illustrated example, the time represented by each major hash mark 308 (as indicated by the labels 314) may be aligned with an intuitive point in time. In some examples, intuitive points in time correspond to the zero-second mark of a minute, the zero-minute mark of an hour, and recurrent points in time between successive minutes and/or hours that align with such zero marks. For example, the major hash marks 308 are on the hour and at every 15 minute increment rather than offset by some arbitrary amount of time (e.g., a 6 minute offset with labeled times at 12:54, 1:09, 1:24, 1:39, etc.). Further, other example intuitive points correspond to time divisions that align with noon, midnight (e.g., a change of day), and/or an operator shift change (e.g., 12:00 AM, 4:00 AM, 8:00 AM, 12:00 PM, 4:00 PM, etc.).

In some examples, the intermediate hash marks 310 divide the timescale 306 between each major hash mark 308 into smaller time divisions. In some examples, the smaller time divisions also correspond to commonly used or intuitive time divisions. Thus, as shown in the illustrated example, the intermediate hash marks 310 are spaced five minutes apart to divide each major time division (of 15 minutes) into three smaller time periods (of 5 minutes). In some examples, the number of intermediate hash marks 310 changes depending upon the major time division. For example, dividing a major time division of 10 minutes into three smaller divisions results in each smaller division being three and a third minutes, which may not be intuitive to an operator. Accordingly, in some examples, as the major hash marks 308 are automatically adjusted to intuitive time divisions based on a change in the total time span represented by the timescale 306, the intermediate hash marks 310 (including the amount between each major hash mark 308) is also automatically adjusted. In some examples, there may be multiple levels of intermediate hash marks. That is, time divisions between intermediate hash marks may be further divided into smaller divisions that are greater than the minor hash marks. In other examples, the intermediate hash marks 310 may be entirely omitted from the timescale 306.

In the illustrated examples, the minor hash marks 312 represent the base incremental unit of time defining the timescale 306. In some examples, a display control banner 316 is provided that includes timescale buttons 318 to select the particular incremental unit of time to be used in generating the timescale 306 and corresponding timeline 302. In the illustrated example of FIG. 3, the timescale button 318 associated with 1 minute increments is selected such that the minor hash marks 312 of the timescale 306 are set at 1 minute increments. As with the major and intermediate hash marks 308, 310, the minor hash marks 312 also correspond to commonly used or intuitive time divisions that align with intuitive points in time (e.g., not offset by an arbitrary amount of time). Thus, as shown in the illustrated example, the time between each minor hash mark 312 corresponds to 1 minute, with each minute set to begin at the zero second mark (rather than being offset by some arbitrary number of seconds). Inasmuch as the minor hash marks 312 represent the base incremental unit of time for the timescale 306, in some examples, the major hash marks 308 and/or the intermediate hash marks 310 are automatically designated to correspond to whole number multiples of the base incremental unit of time.

In some examples, the spatial distance (e.g., number of pixels) between each minor hash mark 312 is fixed to correspond to the width of the active alarm icons 304. In some examples, the spacing between the minor hash marks 312 is slightly larger than the pixel-width of each alarm icon. In this manner, alarms may be represented within a time interval of their occurrence corresponding to the base incremental period of time without any overlap with other alarms occurring in and adjacent incremental period of time.

In some examples, the right-most extent or leading edge of the timescale 306 corresponds to a current or present time. In some examples, the right-most edge of the timescale 306 corresponds to a future point in time associated with an end of the current base incremental unit of time. For example, if the actual time is 1:58:07 PM and the base unit of time is 1 minute (as in the illustrated example), the right-most extent of the timescale is rounded up and shifted to 1:59:00 PM. In this manner, the full width of the time interval between 1:58 and 1:59 PM (associated with the current incremental unit of time) is available to display icons representative of alarms activated during that period. In some such examples, as soon as the time passes 1:59:00, the timescale 306 shifts to have a leading edge set at 2:00:00. By contrast, if the base incremental unit of time set for the timescale 306 is five minutes, the leading edge of the timescale 306 (when the actual time is 1:58:07 PM) is 2:00:00 PM because 2:00 PM is the next intuitive point in time for a five minute base incremental unit of time.

With the leading edge of the timescale 306 set as described above and the distance between the minor hash marks 312 fixed relative to the width of the alarm icons 304 in the illustrated example, the number of separate incremental time intervals in which alarm icons are grouped (e.g., the number of minor hash marks 312 along the entire length of the timescale 306) may be determined based on the available width of the alarm timeline 302. Further, in such examples, the total time span represented along the timescale 306 is a function of the number of separate incremental time intervals and the corresponding base incremental unit of time assigned to each interval. For example, alarm icons may be designed to be 20 pixels wide and the representation of each base incremental unit of time (e.g., the spacing between adjacent minor hash marks 312) is set to be 22 pixels wide to provide an extra pixel on either side of the alarm icons. Further, the full width of the space provided for the timeline 302 may be 1420 pixels. Dividing the total width of 1420 pixels by 22 pixels for each incremental time interval results in a total of 64 base incremental time intervals with 12 pixels remaining. In such an example, the total length of time represented by the timescale 306 with 1 minute base intervals is 64 minutes. If the base incremental unit of time is increased to 5 minutes, the total time span of the timescale 306 is 320 minutes or 5 hours and 20 minutes.

Although the timescale 306 has been described with respect to the major hash marks 308, the intermediate hash marks 310, and the minor hash marks 312 shown in FIG. 3, variations in the display or demarcation of the different time intervals may be implemented in any suitable manner. For example, in addition to or instead of hash marks, vertical lines extending the full height of the alarm timeline 302 may be used. In some examples, differently colored and/or shaded vertical bands may be used in addition to or instead of the hash marks 308, 310, 312 to visually represent the different time intervals represented by the timescale 306.

In some examples, the active alarm timeline 302 is updated in substantially real-time such that as time progresses and new alarms are activated, the icons representative of the new alarms populate the right-most incremental period of time. Further, as time continues to progress past the end of the current incremental period of time, the timescale 306 and the active alarm icons 304 shift towards the left. In some examples, certain alarms may remain active for a period of time longer than the time span of the active alarm timeline 302 such that icons for such alarms are no longer represented within the timeline 302. In some such examples, such alarms are summarized in an older alarms banner 320.

In addition to the active alarm icons 304, in some examples, the active alarm timeline 302 includes control action icons 322 indicative of control actions taken by an operator during a corresponding incremental time interval 316 represented in the timescale 306. In some examples, an operator may implement multiple control actions within the selected incremental time interval. Accordingly, in some examples, each control action icon 322 represents more than one control action. In some examples, the number of control actions represented by each icon 322 is indicated via a numeric indicator 324 associated with each control action icon 322. As such, in some examples, the number of control actions represented by each control action icon 322 depends upon the scale of the timeline defined by the selected base incremental unit of time. Additionally or alternatively, other icons may be included in the timeline to represent other events that may be of interest to operators, engineers, and/or other personnel in reviewing alarm patterns to, for example, identify root causes of alarm floods, train new operators, etc. For example, icons representative of device alerts triggered by self-diagnostic tests performed by particular devices in the process control system may be included above or below the control action icons 322. In this manner, plant personnel are provided a more complete picture of the events occurring in the process control system and the possible sources or causes of alarms.

In some examples, the alarm presentation interface 300 includes an alarm list pane 326 to provide relevant information associated with the active alarms represented in the active alarm timeline 302 in a typical alarm list format. Additionally or alternatively, in some examples, the alarm presentation interface 300 includes a control actions pane 328 to provide relevant information associated with the control actions represented by control action icons 322 in the active alarm timeline 302. Further, in some examples, the alarm presentation interface 300 includes an alarm characteristics banner 330 to provide information summarizing the active alarms represented in the active alarm timeline 302 based on certain alarm characteristics. In some examples, the alarms represented within the active alarm timeline 302, the corresponding alarm list pane 326, and the corresponding control actions pane 328 may be selected and/or filtered via the alarm characteristics banner 330. For example, as shown in FIG. 3, all of the active alarm icons 304 are associated with alarms from an Overhead Receiver Unit 332 of the process control system.

As shown in the illustrated example of FIG. 3, the display control banner 316 includes an activation history button 334.

In some examples, the activation history button 334 is provided to enable an operator and/or other user to access historical process control data (e.g., alarm data and/or control action data) to generate and display an alarm activation timeline shown and described more fully below.

Figure 4:
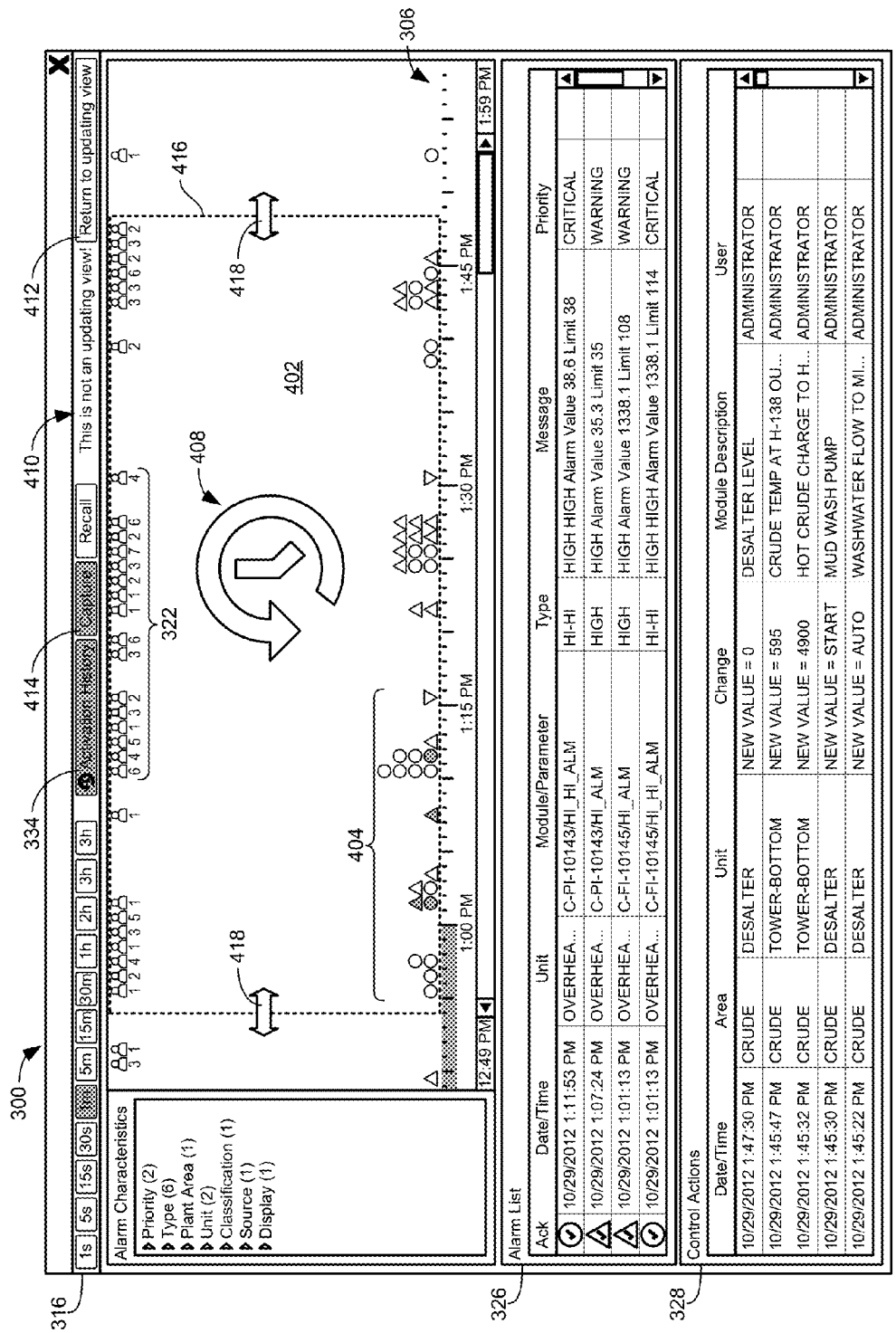
FIG. 4 illustrates the example alarm presentation interface of FIG. 3 displaying an example alarm activation timeline.

FIG. 4 illustrates the example alarm presentation interface 300 of FIG. 3 with an example alarm activation timeline 402 in place of the active alarm timeline 302 shown in FIG. 3. The example timeline 402 of FIG. 4 corresponds to the same period of time as the active alarm timeline 302 of FIG. 3. As shown in the illustrated example, the alarm activation timeline 402 includes historic alarm icons 404 to graphically represent the temporal relationship of each alarm within the process control system 100 that was historically activated during the time span for the timeline 402. As shown in the illustrated example, there are more historic alarm icons 404 in the alarm activation timeline 402 of FIG. 4 than active alarm icons 304 in the active alarm timeline 302 of FIG. 3 because the alarm activation timeline 402 represents alarms that have already cleared and/or were suppressed from display in the active alarm timeline 302. As shown in the illustrated example, the historic alarm icons 404 representative of active alarms (corresponding to the active alarm icons 304 of FIG. 3) are identified in the alarm activated timeline 402 by shading. In other examples, the historic alarm icons 404 that correspond to active alarms may be identified or distinguished in any other visual manner (e.g., color change, highlighting, blinking, etc.). In other examples, the historic alarm icons 404 that correspond to active icons are not demarcated relative to icons representative of previously activated but no longer active alarms.

In some examples, the alarm presentation interface 300 enables a user to toggle between viewing the active alarm timeline 302 of FIG. 3 and the alarm activation timeline 402 of FIG. 4. For example, as described above, a user may select the activation history button 334 (e.g., via a mouse click) to change the display from the active alarm timeline 302 to the alarm activation timeline 402. In some such examples, deselecting the activation history button 334 reverts the display to the active alarm timeline 302. In some examples, one or more visual indications are included within the alarm presentation interface 300 when the alarm activation timeline 402 is rendered to indicate that the alarm data represented is historical and not live or being updated in real-time. For instance, in the illustrated example of FIG. 4, the alarm activation timeline 402 includes a watermark 408 in the background of the timeline that symbolizes the timeline is based on historical data. Further, in some examples, a message 410 in a top banner (e.g., the display control banner 316 and/or a separately created banner) indicates the current view is not updating. In some such examples, a button 412 may be displayed that a user may select to return to a live view (e.g., the active alarm timeline 302).

In some examples, as a user switches from a view of the active alarm timeline 302 as shown in FIG. 3 to the alarm activation timeline 402 as shown in FIG. 4, the process control data in the alarm list pane 326 may change to provide data associated with all alarms activated during the time span of the alarm activation timeline 402. In other examples, as shown in FIG. 4, the alarm list pane 326 provides data associated with only active alarms even when the alarm activation timeline 402 is shown. In this manner, while an operator reviews the alarm activation timeline 402, the operator may still identify the active alarms (at least as of the time the alarm activation timeline is first generated).

In some examples, control actions taken by an operator are represented in the alarm activation timeline 402 in the same manner as in the active alarm timeline 302. That is, as shown in the illustrated examples, the alarm activation timeline 402 of FIG. 4 includes the same control action icons 322 shown in the active alarm timeline 302 of FIG. 3. Likewise, in some examples, the data provided in the control actions pane 328 is the same regardless of whether the active alarm timeline 302 or the alarm activation timeline 402 is selected for viewing.

Beyond toggling between an active alarm timeline and an alarm activation timeline to review any alarms that may have already disappeared from the active alarm timeline, an operator and/or other user may desire to store a particular pattern of alarms experienced for later reference and/or analysis. For example, an operator may wish to preserve an indication of all alarms addressed during a particular alarm flood to share with a second operator in the next shift to facilitate the second operator's understanding in what occurred and any follow up actions that may need to be taken. In some examples, an operator may desire to store a particular pattern of alarms (e.g., an alarm flood) with corresponding control actions taken to serve as a reference when responding to a similar pattern of alarms. In some examples, operators may not have time to reference a stored activation alarm timeline when they are responding to a live alarm flood. However, in some examples, operators and/or other personnel may desire to store recurring patterns of alarms for analysis after the alarm flood to determine root causes, to assess the effectiveness of their response strategies, and/or to consider different approaches in responding to the pattern of alarms. Another reason to store activation alarm timelines is to serve as a resource in training new operators to handle the recorded patterns of alarms.

In some examples, when the alarm activation timeline 402 is displayed via the alarm presentation interface 300, a capture button 414 is provided to enable an operator to request to capture or save the currently viewed alarm activation timeline 402 in a database (e.g., the alarm activation timeline database 212). In some examples, once the capture button 414 is selected, a box or other boundary lines 416 are shown within the timeline 402. In the illustrated example, the box 416 is adjustable (e.g., via the arrows 418) along the timescale 306 to visually set a beginning time and end time demarcating the historical period of time desired to be saved as an alarm activation timeline. As shown in the illustrated example, the historical period of time may be less than the full time span of the alarm activation timeline 402. In some examples, once an operator has positioned the box 416 as desired, a pop-up interface 500 (FIG. 5) may be presented to gather other relevant information for storing the operator designated alarm activation timeline. In some examples, the pop-up interface 500 is provided when a user requests to create or save a new alarm activation timeline without first providing the adjustable box 416. In some examples, the pop-up interface 500 is incorporated into the alarm presentation interface 300.

Figure 5:
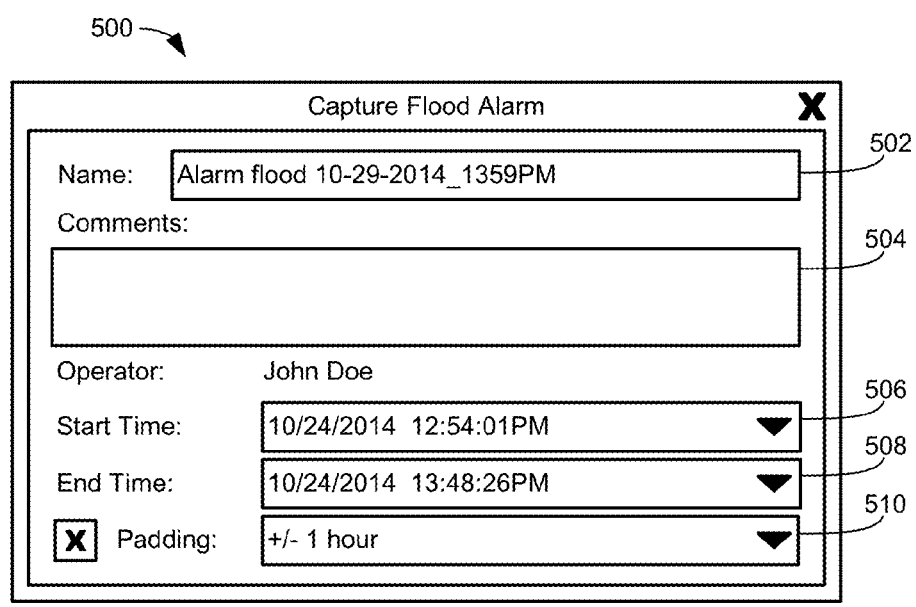
FIG. 5 illustrates an example pop-up interface to enable a user to specify relevant information for capturing the example alarm activation timeline of FIG. 4.

As shown in the illustrated example of FIG. 5, a user may enter a name for the alarm activation timeline to be saved in a name box 502. In some examples, a comment box 504 is provided to collect any comments, remarks, and/or annotations from the user on the particular pattern of alarms being created as a stored alarm activation timeline. In this manner, any particular observations or thoughts of the operator regarding the particular pattern of alarms may be associated with the timeline for later reference. In some examples, the comments may be for the operator's own reference at a later time. In other examples, the comments may be included to inform another person (e.g., a second operator taking over during the next shift, an operator in training, etc.) of the operator's observations. In some examples, the comments may be added and/or edited at a later time after the alarm activation timeline is created and saved. For example, an operator may add certain comments at the time of creating the alarm activation timeline. At a later time, other plant personnel (e.g., process engineers, control engineers, operation managers, and/or other subject matter specialists) may retrieve and review the alarm activation timeline and add additional comments (or edit the previously entered comments) to be associated with the saved timeline based on an investigation of the root cause of an alarm flood represented in the saved alarm activation timeline.

In the illustrated example of FIG. 5, the pop-up interface 500 includes a start time box 506 and an end time box 508 in which the beginning and end time of the particular alarm activation timeline may be designated. In some examples, the start time and end time boxes 506, 508 are automatically populated based on the position of the box 416 set by a user as shown in FIG. 4. In some examples, the pop-up interface 500 includes a padding box 510 designating a time period before the designated start time and after the designated end time of the alarm activation timeline during which process control data will be saved and associated with the timeline. This extra cushion of process control data may be stored with the alarm activation timeline to assist in providing all relevant information for later analysis of the alarm pattern represented in the timeline. For example, an operator may identify a particular pattern of alarms using the box 416 as shown and described above in connection with FIG. 4. However, the root cause of the flood of alarms may have resulted from a control action that occurred sometime before the first alarm was triggered. Accordingly, by associating historical data before and after the designated start and end times of a historical time period identified in the padding box 510, a user can obtain a better understanding of the situation.

Figure 6:
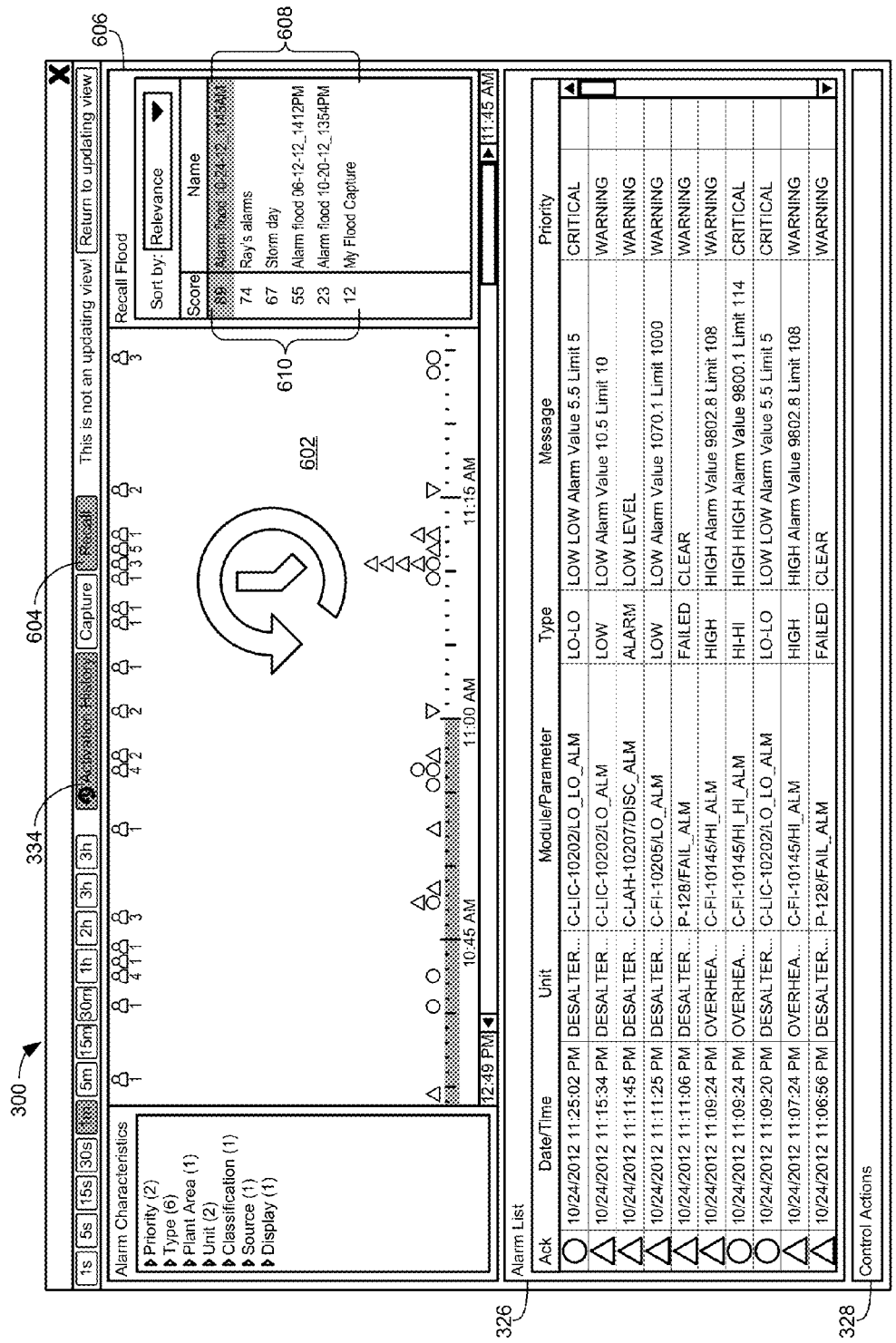
FIG. 6 illustrates the example alarm presentation interface of FIG. 3 displaying another example alarm activation timeline retrieved from a database.

FIG. 6 illustrates the example alarm presentation interface 300 of FIG. 3 with another example alarm activation timeline 602 retrieved from a database (e.g., the alarm activation timeline database 212 of FIG. 2). In some examples, rather than capturing or creating a new alarm activation timeline as described above, an operator and/or other user may desire to retrieve or recall a previously stored alarm activation timeline corresponding to some historical period of time other than a most recent period of time (e.g., other than the time period corresponding to the timescale 306 of the active alarm timeline 302). Accordingly, in some examples, after a user selects the activation history button the alarm presentation interface 300 presents a recall button 604 as shown in FIG. 6. In some examples, when a user selects the recall button 604, a recall banner 606 is presented that includes a list of stored alarm activation timelines 608. In some examples, a user may request that the stored alarm activation timelines 608 be sorted by relevance to the current alarms in the process control system. That is, a user may desire to know which pattern of alarms represented by each of the stored alarm activation timelines 608 is the most similar to the pattern of alarms represented in the alarm activation timeline 402 of FIG. 4 corresponding to the same time period as the active alarm timeline 302 of FIG. 3.

In some examples, the relevance or similarity of the stored alarm activation timelines 608 to the current alarm activation timeline 402 is based on a comparison or matching of the alarm patterns in each of the timelines. As described above, this analysis may be performed by the alarm pattern analyzer 216 of FIG. 2 using any suitable pattern matching algorithm. In some examples, the relevance or similarity is represented as a score or value 610 to facilitate a comparison of the relevance of the different stored alarm activation timelines 608. In some examples, the score 610 is based on an amount of overlap between the alarms (e.g., number of common alarms) activated in the timelines compared. In some examples, the score 610 is based on the portion of common or overlapping alarms relative to the portion of different alarms between each timeline. In some examples, the score 610 is based on the order or sequencing of the alarms in each timeline regardless of their temporal spacing. In other examples, the score 610 is based on the particular timing and/or temporal spacing of the alarms in each timeline. In some examples, the score 610 is based on a comparison of the control actions and/or the timing of control actions in addition to the alarms activated during each timeline.

In some examples, when a user selects (e.g., via a mouse click) one of the stored alarm activation timelines 608 listed in the recall banner 606, the corresponding timeline is rendered within the alarm presentation interface 300 in place of the active alarm timeline 302 of FIG. 3 or the alarm activation timeline 402 of FIG. 4. In this manner, a user can quickly view each timeline to visually compare the patterns of alarms represented in each. As can be seen in FIG. 6, the alarm timeline 602 is somewhat different than the alarm activation timeline 402 of FIG. 4. In some examples, when a stored alarm activation timeline 608 is retrieved from the alarm activation timeline database 212, the data in the alarm list pane 326 and the control actions pane 328 (collapsed in FIG. 6) is updated to include data corresponding with the selected alarm activation timeline. In some examples, multiple timelines may be opened in separate tabs to further facilitate the comparison of multiple alarm timelines also stored in the database 212. Additionally or alternatively, in some examples, more than one timeline may be rendered simultaneously to enable a side-by-side comparison of the patterns of alarms in each timeline.

Figure 7:
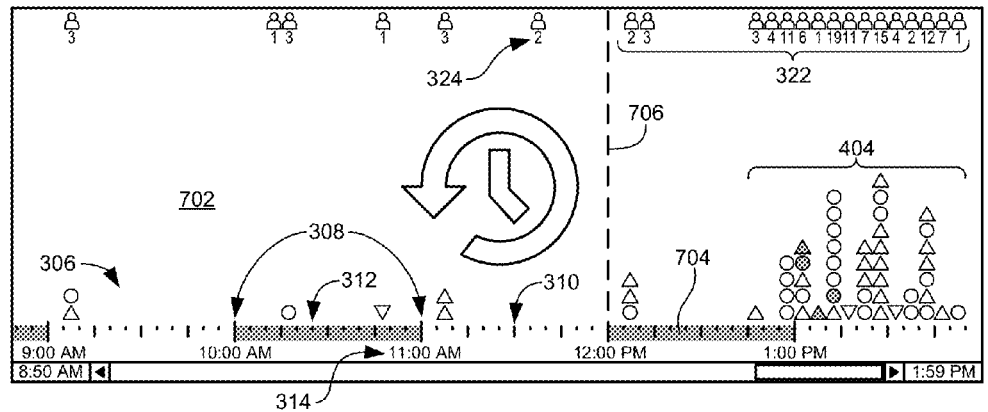
FIGS. 7 and 8 illustrate example alarm activation timelines similar to FIG. 4 but with different base incremental units of time.

FIG. 7 illustrates an example alarm activation timeline 702 corresponding to the same historical period of time (e.g., going back from the same current time) as shown in the example alarm activation timeline 402 of FIG. 4. The example alarm activation timeline 702 of FIG. 7 differs from the alarm activation timeline 402 of FIG. 4 in that the timescale 306 is generated with a different base incremental unit of time. In particular, whereas the timescale 306 in FIG. 4 is generated using base incremental units of time, the timescale 306 in the alarm activation timeline 702 of FIG. 7 is generated using 5 minute incremental base units of time. As a result, as the time at the leading edge of both timelines 402, 702 is the same but the base incremental unit of time in FIG. 7 is greater, the timescale 306 in the alarm activation timeline 702 of FIG. 7 extends further back in time. Similarly, all of the alarm icons 404 shown across the entire length of the alarm activation timeline 402 of FIG. 4 are positioned within the right-most portion of the timeline 702 of FIG. 7. The more condensed grouping of the alarm icons 404 in the illustrated example of FIG. 7 results from each stack or column of icons corresponding to a longer incremental time interval. For purposes of explanation and comparison, the icons corresponding to the active alarm icons 304 of FIG. 3 are shown shaded in FIG. 7. Further, in the illustrated example of FIG. 7, the numeric indicators 324 associated with the control action icons 322 are updated (e.g., increased) to reflect the greater number of control actions occurring during the longer incremental time intervals.

As shown in the alarm activation timeline 702 of FIG. 7, the timescale 306 includes a different arrangement of the major hash marks 308 with the corresponding labels 314 than in the alarm activation timeline 402 of FIG. 4. In particular, the duration of time between adjacent major hash marks 308 in FIG. 7 (based on a 5 minute base incremental unit of time) corresponds to 1 hour. Further, each such major time period is divided into four segments by intermediate hash marks 310 to demarcate 15 minute intervals between each hour corresponding to three base incremental units of time (represented by the minor hash marks 312). By contrast, the duration of time between adjacent major hash marks 308 in FIG. 4 (based on a 1 minute base incremental unit of time) corresponds to 15 minutes with three divisions (demarcated by the intermediate hash marks 308) of five incremental units of time (represented by the minor hash marks 312). Dynamically adjusting the timescale 306 based on a selected base incremental unit of time in this manner with different arrangement of hash marks 308, 310, 312 and corresponding labels 314 enables an operator to quickly understand the timing and temporal relationship of alarms based on commonly used and/or intuitively based time divisions and labels.

Figure 8:
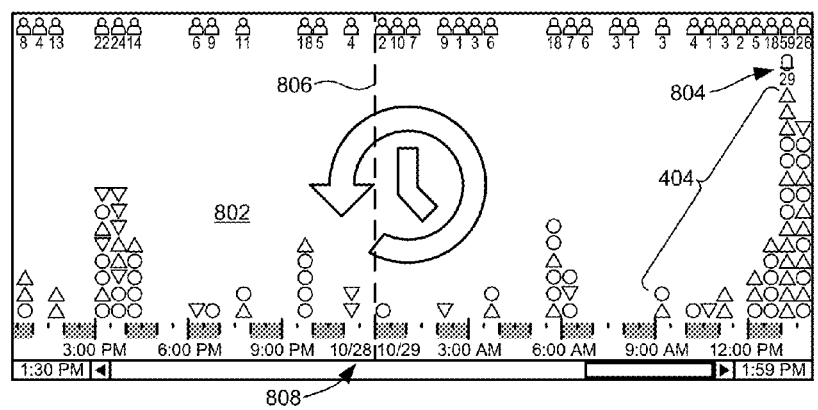

FIG. 8 illustrates an example alarm activation timeline 802 corresponding to the same alarm history as shown in the example alarm activation timelines 402, 702 of FIGS. 4 and 7 except with a base incremental unit of time of 30 minutes. Further, as shown in the illustrated example, the overall width of the alarm activation timeline 802 of FIG. 8 is less than the total width of the timelines 402, 702 of FIGS. 4 and 7. As a result, the timescale 306 in the alarm activation timeline 802 includes fewer intervals of the base unit of time because the space (e.g., pixel-width) between adjacent minor hash marks is kept consistent regardless of the overall size (e.g., overall pixel-width) of the timeline 802. In this manner, unless a user selects a different base incremental unit of time, the particular alarm pattern represented in a timeline remains constant regardless of whether a user resizes the alarm presentation interface or otherwise alters the available space for displaying the timeline (e.g., by changing resolution on a screen).

In the illustrated example of FIG. 8, the alarm icons 404 have become more concentrated in fewer incremental time intervals than in FIGS. 4 and/or 7 because the selected base unit of time in FIG. 8 corresponds to a longer duration (30 minutes). More particularly, in the illustrated example, all of the historic alarm icons 404 represented across the entire time span of the alarm activation timeline 402 of FIG. 4 are represented within the first (right-most) three time increments of the alarm activation timeline 802 of FIG. 8. All other historic alarm icons 404 are representative of alarms occurring at an earlier point in time. In some examples, more alarms may have been activated during a specific incremental time period such that the vertical space in the timeline to represent the alarms cannot accommodate all of the icons needed to represent these alarms. Accordingly, in some examples as shown in FIG. 8, an excess alarm icon 804 is provided at the top of the stack of alarm icons with a number indicating the number of alarms not represented with an icon within that particular incremental period of time.

In some examples, the timelines disclosed herein and/or the associated timescales may include additional visual indicators to facilitate operators and/or other personnel in recognizing and understanding the time represented in the timelines. For example, as shown in FIG. 7, separate hours may be demarcated by shading and/or coloring along the corresponding lengths of the timescale (e.g., shading 704 of FIG. 7). In some examples, such one hour segments are consistently highlighted regardless of the base incremental unit of time. Thus, as shown in the illustrated examples, the timescale 306 in each timeline 402, 702, 802, of FIGS. 4, 7, and 8 includes alternately shaded and unshaded segments corresponding to one hour periods of time. In some examples, a line vertically extending across a timeline (such as a line 706 in FIG. 7) identifies a transition between the AM and the PM (or vice versa). In others examples, a line vertically extending across a timeline (such as a line 806 in FIG. 8) identifies a transition between days (e.g., a change of date at midnight) without a corresponding indication between the morning and afternoon. In some such examples, the timescale includes a date label 808 at the hash mark corresponding to midnight (e.g., 12:00 AM) to assist an operator in quickly assessing the date(s) for which the icons 404 are represented and reducing potential confusion with changes from morning to afternoon (e.g., 12:00 PM). In the illustrated example, the label 808 includes the date corresponding to each day on either side of the line 806. In other examples, the date change may be indicated in other manners (e.g., only showing the date of the new day). Although one hour periods, 12 hour periods, and 24 hours periods may be visually demarcated for the benefit of a user, any other suitable period of time may also be highlighted such as, for example, shifts of different operators and/or other personnel. Further, any suitable visual indicators other than shading, coloring, and/or lines may additionally or alternatively be used to visually identify the relevant periods of time for a user.

Flowcharts representative of example methods for implementing the operator station 104 of FIGS. 1 and/or 2 are shown in FIGS. 9-12. The methods may be implemented using machine readable instructions that comprise a program for execution by a processor such as the processor 1312 shown in the example processor platform 1300 discussed below in connection with FIG. 13. The program may be embodied in software stored on a tangible computer readable storage medium such as a CD-ROM, a floppy disk, a hard drive, a digital versatile disk (DVD), a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 9-12, many other methods of implementing the example operator station 104 may alternatively be used. For example, the order of execution of the blocks may be changed, and/or some of the blocks described may be changed, eliminated, or combined.

As mentioned above, the example methods of FIGS. 9-12 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 9-12 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

Figure 9:
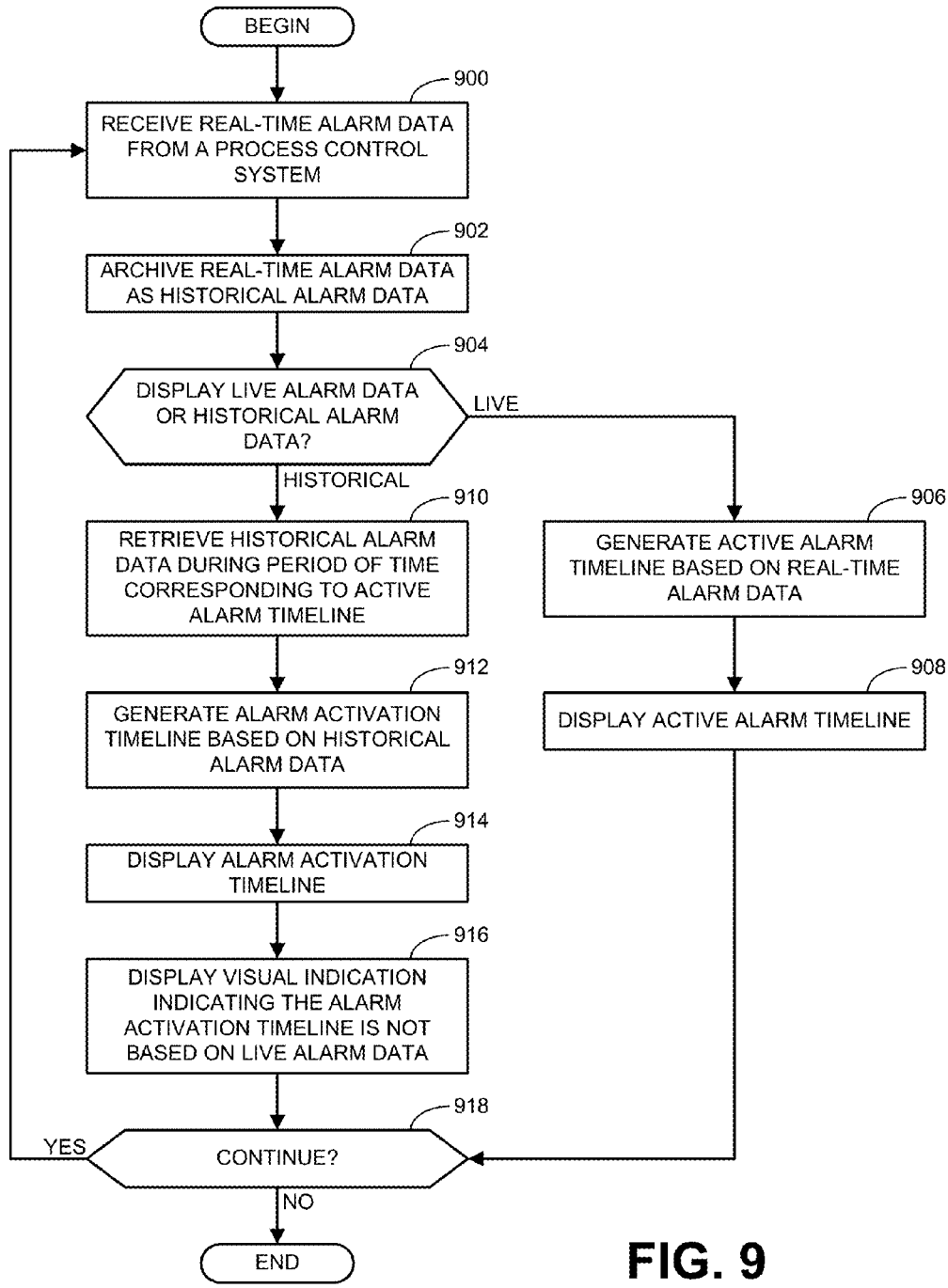
FIGS. 9-12 are flowcharts representative of example methods that may be carried out to implement the example operator station of FIGS. 1 and/or 2.

Turning in detail to the drawings, FIG. 9 is a flowchart representative of an example method that may be carried out to implement the example operator station 104 of FIGS. 1 and/or 2 to toggle between an active alarm timeline and an alarm activation timeline. The example method begins at block 900 where the example communication interface 204 receives real-time alarm data from a process control system. At block 902, the example historical data archive 206 archives the real-time alarm data as historical alarm data. At block 904, the example alarm presentation module 202 determines whether to display live alarm data or historical alarm data. In some examples, this determination is based on user input (e.g., whether a user selects the activation history button 334 of FIG. 4). If the alarm presentation module 202 determines that live alarm data is to be displayed, control advances to block 906 where the example active alarm timeline generator 208 generates an active alarm timeline based on the real-time alarm data. At block 908, the example alarm presentation module 202 displays the active alarm timeline. Control then advances to block 918, where the example alarm presentation module determines whether to continue the example process.

Returning to block 904, if the alarm presentation module 202 determines that historical alarm data is to be displayed, control advances to block 910 where the example alarm activation timeline generator 210 retrieves the historical alarm data during the period of time corresponding to the active alarm timeline (e.g., generated at block 906). Thus, although historical alarm data is retrieved, the period of time associated with the historical data in the illustrated example is a most recent period of time corresponding to the representation of the real-time data. That is, the real-time alarm data and the historical alarm data correspond to the same time period but the historical alarm data includes data associated with alarms that have already cleared and, thus, would only be represented historically. At block 912, the example alarm activation timeline generator 210 generates an alarm activation timeline based on the real-time alarm data. At block 914, the example alarm presentation module 202 displays the alarm activation timeline. At block 916, the example alarm presentation module 202 displays a visual indication indicating the alarm activation timeline is not based on live alarm data. That is, the visual indication serves to inform a user that the displayed alarm activation timeline is not being updated in real-time in contrast to the active alarm timeline. At block 918, the example alarm presentation module determines whether to continue the example process. If so, control returns to block 900. Otherwise, the example method of FIG. 9 ends.

Figure 10:
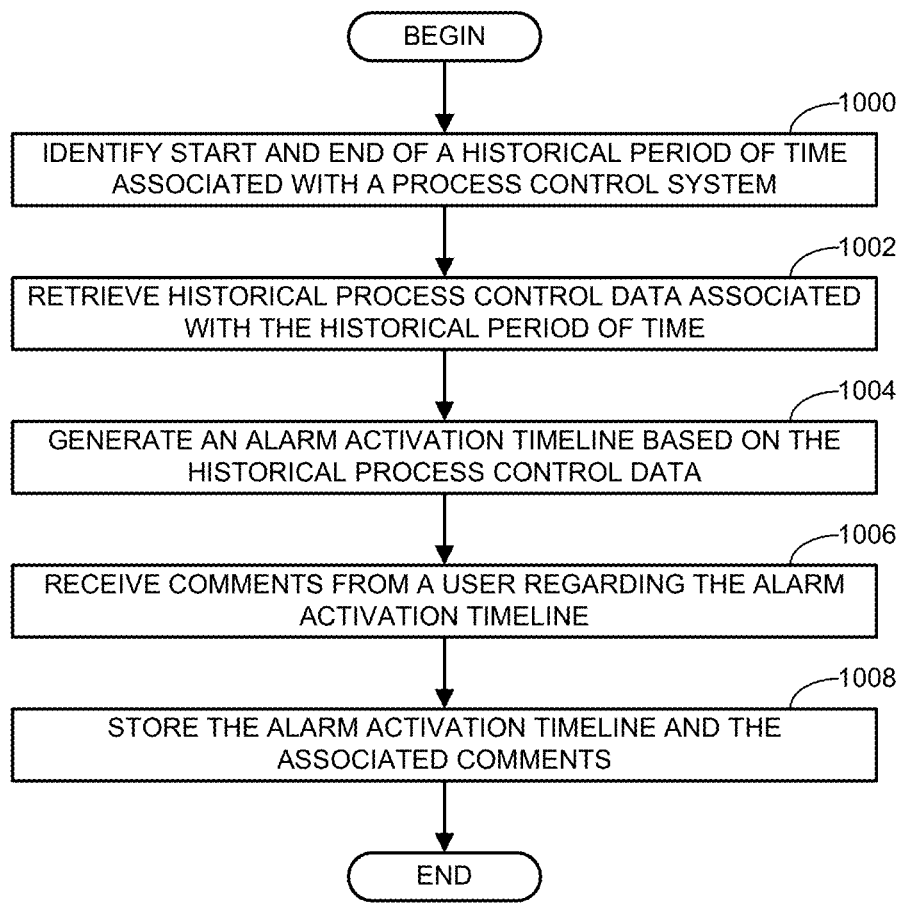

FIG. 10 is a flowchart representative of an example method that may be carried out to implement the example operator station 104 of FIGS. 1 and/or 2 to create a new alarm activation timeline for storage in the alarm activation timeline database 212. The example method of FIG. 10 begins at block 1000 where the example alarm presentation module 202 identifies a start and an end of a historical period of time associated with a process control system. In some examples, the start and end of the historical period are identified by a user visually adjusting boundaries of a box 416 around icons in a timeline representative of alarms activated in the process control system. At block 1002, the example alarm activation timeline generator 210 retrieves historical process control data associated with the historical period of time. In some examples, the process control data includes alarm data and/or operator control data during the historical time period. In some examples, the retrieved process control data includes alarm data and/or operator control data collected immediately before or after the start and end times of the historical period of time to ensure all relevant information is associated with the alarm activation timeline to be created. At block 1004, the example alarm activation timeline generator 210 generates an alarm activation timeline based on the historical process control data. At block 1006, the example alarm presentation module 202 receives comments from a user regarding the alarm activation timeline. At block 1008, the example alarm activation timeline database 212 stores the alarm activation timeline and the associated comments, at which point the example method of FIG. 10 ends.

Figure 11:
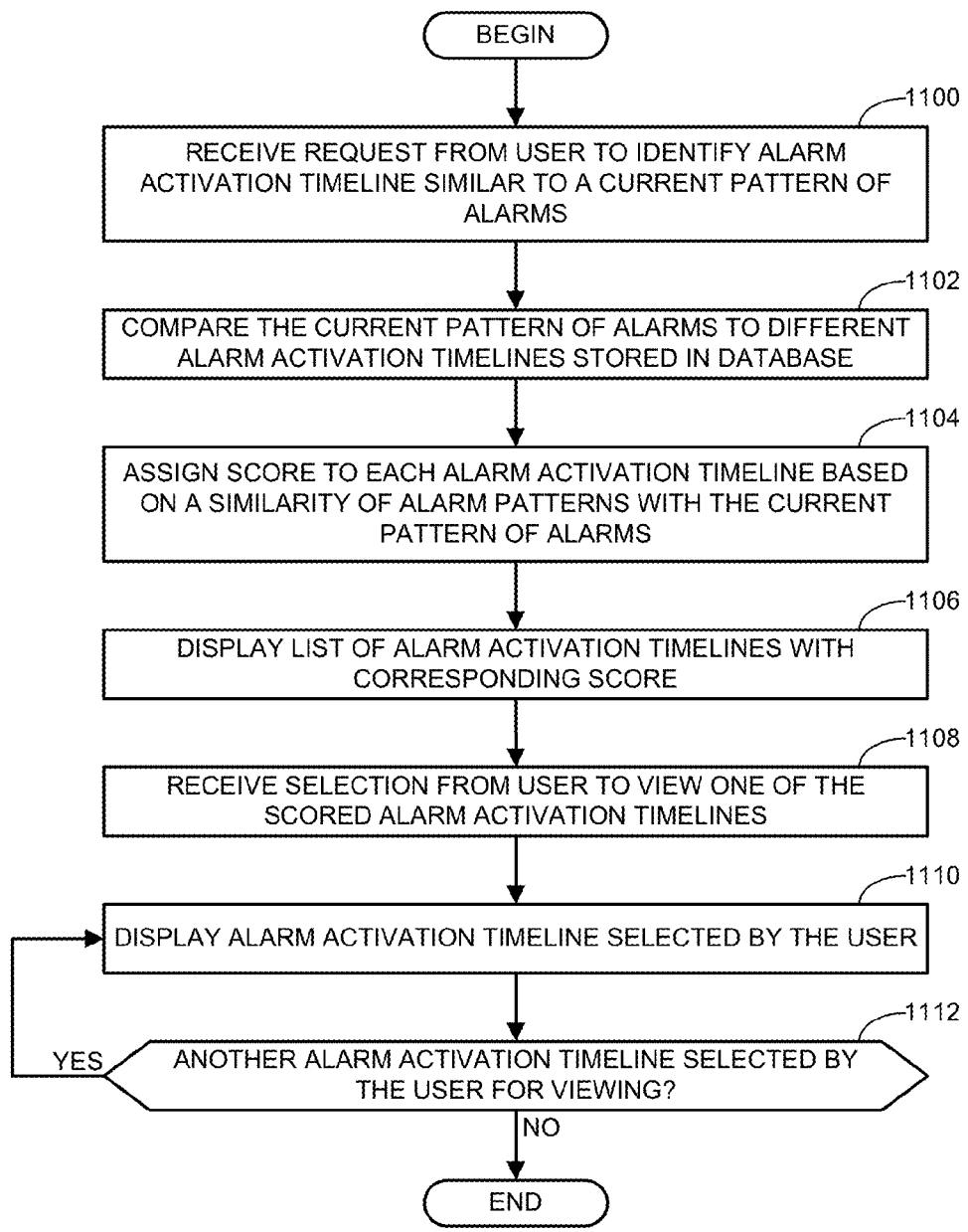

FIG. 11 is a flowchart representative of an example method that may be carried out to implement the example operator station 104 of FIGS. 1 and/or 2 to identify a stored alarm activation timeline for a historical period of time similar to a currently experienced pattern of alarms. The example method begins at block 1100 where the example alarm presentation module 202 receives a request from a user to identify an alarm activation timeline similar to a current pattern of alarms. In some examples, the current pattern of alarms may be presented to the user in an active alarm timeline. In some examples, the user (e.g., an operator) may have already resolved some alarms associated with the pattern of interest such that the alarms would not be represented in the active alarm timeline. As such, in some examples, the pattern of alarms may be presented to the user in an alarm activation timeline corresponding to the time span associated with the active alarm timeline.

At block 1102, the example alarm pattern analyzer 216 compares the current pattern of alarms (e.g., the alarm activation timeline corresponding to the active alarm timeline) to different alarm activation timelines stored in a database (e.g., the alarm activation timeline database 212). At block 1104, the example alarm pattern analyzer 216 assigns a score to each alarm activation timeline based on a similarity of alarm patterns with the current pattern of alarms. At block 1106, the example alarm presentation module 202 displays a list of the alarm activation timelines with the corresponding score. At block 1108, the example alarm presentation module 202 receives a selection from the user to view one of the scored alarm activation timelines. At block 1110, the example alarm presentation module 202 displays the alarm activation timeline selected by the user. At block 1112, the example alarm presentation module 202 determines whether another alarm activation timeline selected by the user for viewing. If so, control returns to block 1110. Otherwise, the example method of FIG. 11 ends.

Figure 12:
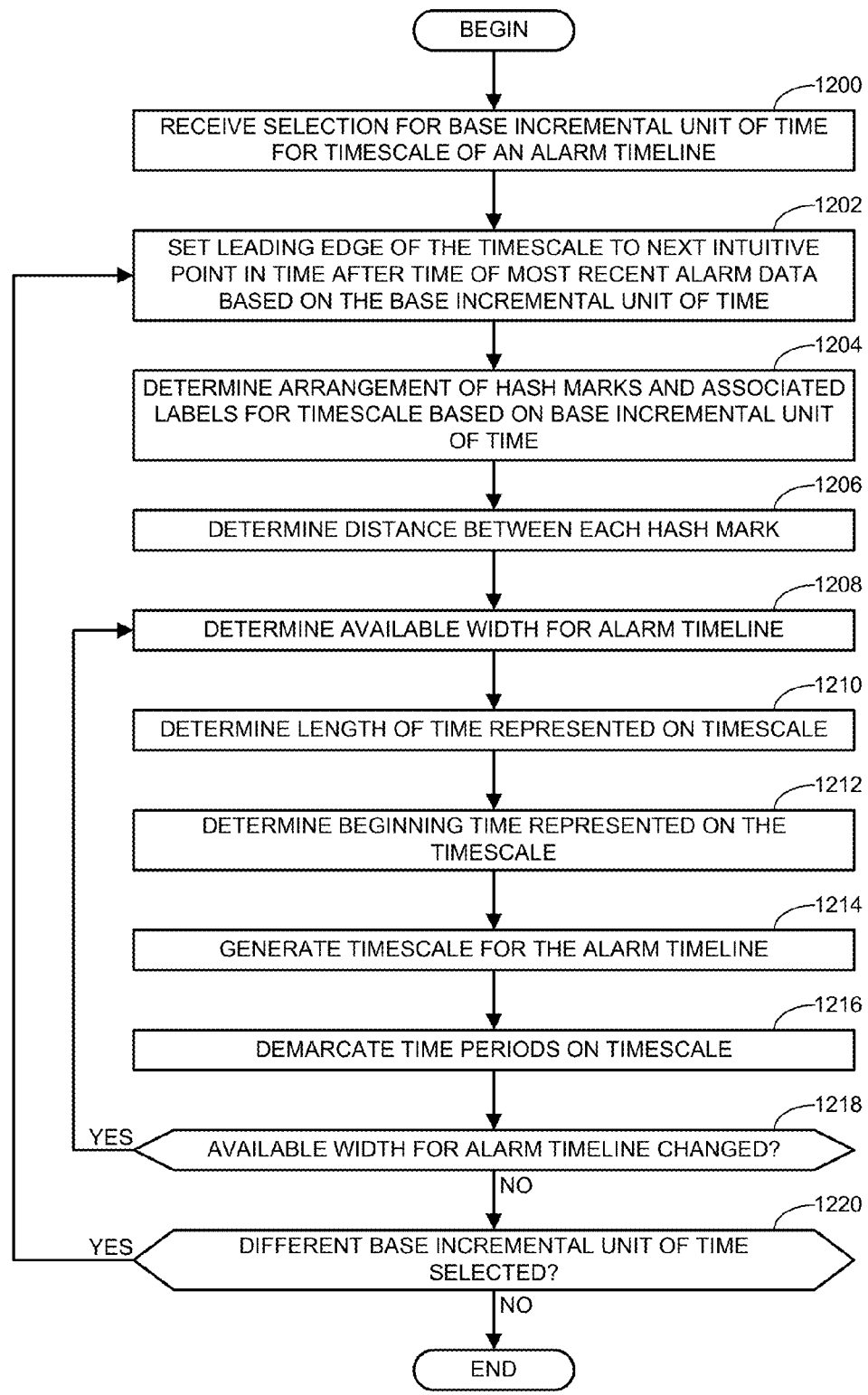

FIG. 12 is a flowchart representative of an example method that may be carried out to implement the example operator station 104 of FIGS. 1 and/or 2 to generate a timescale for a timeline. The example method begins at block 1200 where the example communication interface 204 receives a selection for a base incremental unit of time for a timescale of an alarm timeline. In some examples, such a selection is received when a user selects (e.g., via mouse click) a timescale button 318 of the alarm presentation interface 300. At block 302, the example timescale generator 214 sets a leading edge (e.g., the right-most edge) of the timescale to the next intuitive point in time after the time of the most recent alarm data based on the base incremental unit of time. In examples where the timeline is an active alarm timeline that is being updated in substantially real-time, the time of the most recent alarm data is the present. Thus, in such examples, the next intuitive point in time is some portion of the selected incremental period of time into the future. For example, if the current time is 2:37:14 PM, the next intuitive point in time is 2:38:00 PM for 1 minute incremental units of time, 2:40:00 PM for 5 or 10 minute incremental units of time, 2:45:00 PM for 15 minute incremental units of time, 3:00:00 PM for 30 minute incremental units of time, and so forth. In examples where the timeline is an activation alarm timeline (based on historical data) associated with a historical period of time other than the most recent time (corresponding to the time span of an active alarm timeline), the time of the most recent alarm data corresponds to the end time of the historical period as designated by a user when the alarm activation timeline is stored in the example alarm activation timeline database 212.

At block 1204, the example timescale generator 214 determines an arrangement of hash marks (or other time markings) and associated labels for the timescale based on the base incremental unit of time. In some examples, the scale for minor hash marks is defined by the base incremental unit of time. However, to enable an operator to quickly identify the represented time along the scale, major hash marks with corresponding labels may be designated. In some examples, the major hash marks are arranged to be sufficiently wide apart (e.g., with a sufficient number of minor hash marks therebetween) so that labels for the major hash marks can be easily read and identified but close enough together so that an operator can quickly determine the timing of the hash marks between the labeled major has marks. Further, in some examples, the major hash marks and corresponding labels are arranged to correspond with commonly used and/or intuitive intervals of time at intuitive points in time. That is, rather than designating every 4th, 5th, 10th, or some other arbitrary number of minor hash marks as a major hash mark, the example timescale generator 214 automatically determines intuitive intervals for the timescale and dynamically alters the timescale based on changes in the base incremental unit of time. For example, if the base incremental unit of time is 1 minute, the example timescale generator 214 may place a major hash mark at 15 minute time periods (as in FIGS. 3, 4, 6, 7) as quarter hour intervals are commonly used and intuitively understood. In other examples, major hash marks may be placed every 10 minutes apart or any other suitable interval that is a multiple of the base incremental unit of time and that is a commonly used time division. Further, in some examples, the placement of the major hash marks relative to the minor hash marks is designated to be at intuitive points in time corresponding to the time interval between major hash marks. That is, rather than placing major hash marks at intervals along the timescale beginning at the edge of the timescale, the major hash marks are set along the timescale at times easily recognizable to an operator. For example, if the leading edge of a timescale (with a 1 minute base unit of time) is 2:38:00 PM and major hash marks are to be set 15 minutes apart, the first major hash mark would be set eight minutes previously at 2:30:00 PM rather than 15 minutes previously at 2:23:00 PM. Additionally, in some examples, the timescale generator 214 may include intermediate hash marks (or other visual indicators) to designate intuitive time intervals that are less than the major time interval but more than the base incremental unit of time.

At block 1206, the example timescale generator 214 determines the distance between each hash mark. In some examples, the distance between each hash mark corresponds to the width (e.g., number of pixels across) of the alarm icons to be displayed in the alarm timeline. In some examples, the distance between adjacent hash marks is slightly larger than the pixel-width of each alarm icon to provide some padding or space on either side such that a user can clearly view each icon. In some examples, the pixel-width of alarm icons may be fixed such that the distance between hash marks is also fixed. In other examples, a user may have the ability to zoom or change the size of the alarm icons such that the corresponding distance between the hash marks would need to be determined and adjusted accordingly.

At block 1208, the example alarm presentation module 202 determines the available width for the alarm timeline. In some examples, the available width is based on a number of pixels. As such, in some examples, the available width for the alarm timeline depends upon the overall size of the window or application frame in which the alarm presentation interface is displayed, the resolution of the screen displaying the alarm presentation interface, and the portion of the alarm presentation interface designated for the alarm timeline.

At block 1210, the example timescale generator 214 determines a length of time to be represented on the timescale. In some examples, the length of time or time span for the timescale corresponds to the number hash marks that fit across the available width for the timescale multiplied by the base incremental unit of time. For example, if the distance between each hash mark is set to 22 pixels (determined at block 1206) and the available space designated for the timeline is 1260 pixels (determined at block 1208), the total number of hash marks and corresponding incremental time intervals is 57 (1260÷22=57.3). Thus, if the base incremental unit of time is set (at block 1200) to 1 minute, the length of time represented is 57 minutes. For comparison, if the incremental unit of time is set to 15 minutes, the length of time represented is 855 minutes or 14 and one quarter hours.

At block 1212, the example timescale generator 214 determines the beginning time represented on the timescale (e.g., at the left-most edge of the timescale). In such examples, the beginning time corresponds to the time at the leading (right-most) edge of the timescale backwards the length of time represented on the timescale. Using the above example, if the current time is 2:37:14 PM the beginning time of the timescale with a 1 minute base incremental unit of time is 1:41:00 PM (57 minutes back from 2:38:00 PM). In the example where the current time is 2:37:14 PM with a base incremental unit of time of 15 minutes, the beginning time of the timescale is 12:30:00 AM (855 minutes back from 2:45:00 PM).

At block 1214, the example timescale generator 214 generates the timescale for the alarm timeline. At block 1216, the example timescale generator 214 demarcates time periods on the timescale. For example, every other hour may be demarcated by coloring or shading to distinguish changes in the hour. In some examples, other time periods may additionally or alternatively be identified to facilitate a user in understanding the time represented by the alarm timeline.

At block 1218, the example alarm presentation module 202 determines whether the available width for the alarm timeline has changed. A change in available width may occur if, for example, the window or frame of the alarm presentation interface is resized and/or portions of the content within the alarm presentation interface (e.g., the alarm characteristics banner 330 of FIG. 3) are resized. If the available width has changed, control returns to block 1208 to regenerate the timescale over a different span. Otherwise control advances to block 1220 where the communication interface 204 determines whether a different base incremental unit of time has been selected. If so, control returns to block 1202 to regenerate the timescale accordingly. Otherwise, the example method of FIG. 12 ends.

Figure 13:
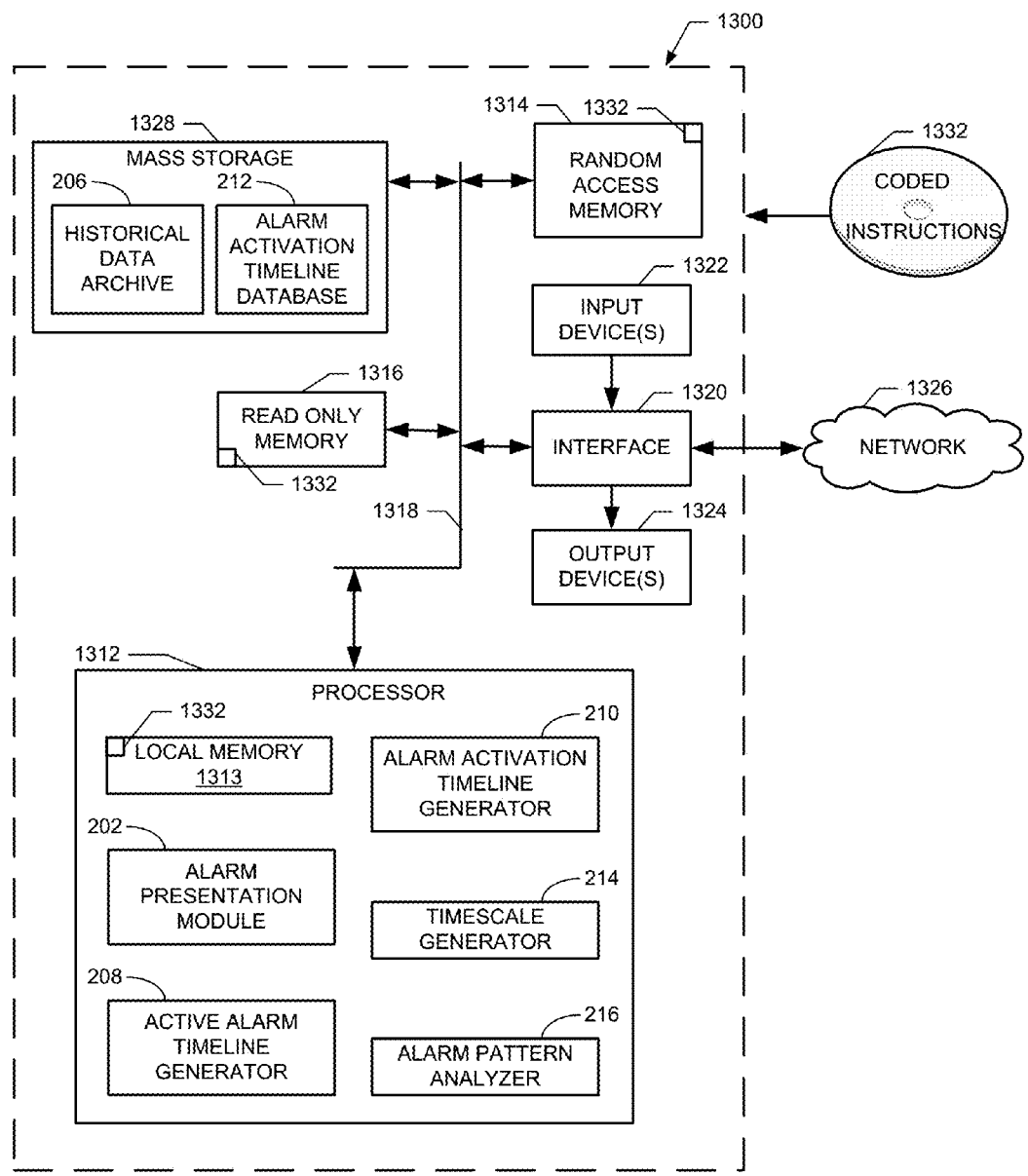
FIG. 13 is a schematic illustration of an example processor platform that may be used and/or programmed to carry out the example methods of FIGS. 9-12, and/or, more generally, to implement the example operator station of FIGS. 1 and/or 2.

FIG. 13 is a schematic illustration of an example processor platform 1300 that may be used and/or programmed to carry out the example methods of FIGS. 9-12, and/or, more generally, to implement the example operator station 104 of FIGS. 1 and/or 2. The processor platform 1300 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors or controllers from any desired family or manufacturer.

The processor 1312 of the illustrated example includes a local memory 1313 (e.g., a cache). In the illustrated example, the processor 1312 implements the example alarm presentation module 202, the example active alarm timeline generator 208, the example alarm activation timeline generator 210, the example timescale generator 214, and/or the example alarm pattern analyzer 216. The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1300 of the illustrated example also includes one or more mass storage devices 1328 for storing software and/or data. For example, the mass storage device 1328 may include the example historical data archive 206 and/or the example alarm activation timeline database 212 of FIG. 2. Examples of such mass storage devices 1328 include floppy disk drives, hard drive disks, compact disk drives, Blu-ray disk drives, RAID systems, and digital versatile disk (DVD) drives.

Coded instructions 1332 to implement the methods of FIGS. 9-12 may be stored in the mass storage device 1328, in the volatile memory 1314, in the non-volatile memory 1316, and/or on a removable tangible computer readable storage medium such as a CD or DVD.

From the foregoing, it can be appreciated that the above disclosed methods, apparatus and articles of manufacture receive and organize process control data associated with alarms in a process control system for visual display to operators and/or other users in a manner that facilitates their understanding of the temporal relationship of currently active alarms being represented, the relationship of such alarms to other alarms that previously occurred but are no longer active, and the relationship or similarity of the patterns of such alarm activation to alarms patterns occurring during other historical periods of time. In particular, in some examples, alarm activation timelines may be generated, stored, commented upon, and subsequently recalled for further analysis to identify alarm flood root causes, to evaluate the effectiveness of operator response strategies, and/or to provide guidance to other operators (e.g., in training and/or taking over in a subsequent shift) regarding what alarm patterns have occurred. Further, in some examples, stored alarm timelines may be compared to other alarm timelines and assigned a score based on similarity to assist operators and/or other users in potentially identifying alarm patterns or sequences that may be relevant to a current alarm flood or other pattern that the operators are facing. Additionally, whether the timelines disclosed herein are based on real-time data or historical data associated with a different historical period of time, in some examples, the timescales generated for the timelines may by dynamically updated based on a change in a user-selected base incremental unit of time to include markings and associated labels that are intuitive and facilitate users in quickly understanding the temporal relationships of the alarm data being represented.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
retrieving process control data generated in a process control system during a historical period of time having a start time set by a user, the process control data comprising alarm data associated with alarms activated during the historical period of time;
generating an alarm activation timeline for the historical period of time, the alarm activation timeline including icons representative of the alarms to visually represent a temporal relationship of activation of the alarms, one of the icons representative of an alarm that is no longer active; and
storing the alarm activation timeline in a database.

2. The method of claim 1, wherein the process control data comprises operator control data indicative of control actions taken by an operator during the historical period of time.

3. The method of claim 2, further comprising graphically representing a timing of the control actions within the alarm activation timeline.

4. The method of claim 1, further comprising:
receiving comments on the historical period of time from the user; and
associating the comments with the alarm activation timeline stored in the database.

5. The method of claim 1, further comprising;
monitoring the process control system in substantially real-time to receive real-time alarm data;
generating an active alarm timeline to visually represent a temporal relationship of active alarms in the process control system; and
storing the real-time alarm data as additional process control data.

6. The method of claim 5, further comprising:
comparing a first pattern of alarms based on the real-time alarm data to a second pattern of alarms based on the process control data for the historical period of time; and
calculating a similarity between the first pattern of alarms and the second pattern of alarms.

7. The method of claim 5, further comprising:
generating a second alarm activation timeline for a select period of time corresponding to the active alarm timeline, the second alarm activation timeline based on the additional process control data; and
alternating between a display of the active alarm timeline and the second alarm activation timeline in response to a user request, the second alarm activation timeline representing alarms activated during the select period of time that are no longer active in addition to the active alarms represented in the active alarm timeline.

8. The method of claim 7, further comprising displaying a visual indication with the second alarm activation timeline to distinguish the second alarm activation timeline from the active alarm timeline, the visual indication indicating the second alarm activation timeline does not represent real-time data.

9. The method of claim 1, further comprising:
receiving a user selection of a base incremental unit of time defining a duration of minor time intervals represented on a timescale associated with the alarm activation timeline, wherein the icons representative of the alarms activated during each of the minor time intervals are grouped for display via the alarm activation timeline separate from the icons representative of the alarms activated during other ones of the minor time intervals;
determining a time span for the timescale based on the base incremental unit of time and a width of available space for the alarm activation timeline; and
displaying the alarm activation timeline with the timescale.

10. The method of claim 9, further comprising
demarcating major time intervals along the timescale, each major time interval including at least two of the minor time intervals; and
labeling the major time intervals, wherein some of the major time intervals are aligned with points in time corresponding to at least one of a zero-second mark of a minute, a zero-minute mark of an hour, an operator shift change, midnight, or noon.

11. The method of claim 10, wherein each of the major and minor time intervals is associated with commonly used time divisions corresponding to at least one of one second, five seconds, fifteen seconds, thirty seconds, one minute, five minutes, ten minutes, fifteen minutes, thirty minutes, one hour, two hours, three hours, four hours, six hours, eight hours, twelve hours, or one day.

12. An apparatus, comprising:
an alarm activation timeline generator to:
retrieve process control data generated in a process control system during a historical period of time having a start time and an end time set by a user, the process control data comprising alarm data associated with alarms activated during the historical period of time; and
generate an alarm activation timeline for the historical period of time, the alarm activation timeline including icons representative of the alarms to visually represent a temporal relationship of activation of the alarms, one of the icons representative of an alarm that is no longer active; and
an alarm activation timeline database to store the alarm activation timeline.

13. The apparatus of claim 12, further comprising;
a communication interface to monitor the process control system in substantially real-time to receive real-time alarm data, wherein the real-time alarm data is to be stored as additional process control data; and
an active alarm timeline generator to generate an active alarm timeline to visually represent a temporal relationship of active alarms in the process control system.

14. The apparatus of claim 13, further comprising an alarm presentation module to display the alarm activation timeline, wherein the alarm activation timeline generator is to generate a second alarm activation timeline for a select period of time corresponding to the active alarm timeline, the second alarm activation timeline based on the additional process control data, the alarm presentation module to alternate between a display of the active alarm timeline and the second alarm activation timeline in response to a user request, the second alarm activation timeline representing alarms activated during the select period of time that are no longer active in addition to the active alarms represented in the active alarm timeline.

15. The apparatus of claim 12, further comprising:
a timescale generator to define a duration of minor time intervals represented on a timescale associated with the alarm activation timeline based on a base incremental unit of time selected by the user, wherein the icons representative of the alarms activated during each of the minor time intervals are grouped for display via the alarm activation timeline separate from the icons representative of the alarms activated during other ones of the minor time intervals, the timescale generator further to determine a time span for the timescale based on the base incremental unit of time and a width of available space for the alarm activation timeline; and an alarm presentation module to display the alarm activation timeline with the timescale.

16. The apparatus of claim 15, wherein the timescale generator is to demarcate and label major time intervals along the timescale, each major time interval including at least two of the minor time intervals, wherein some of the major time intervals are aligned with points in time corresponding to at least one of a zero-second mark of a minute, a zero-minute mark of an hour, an operator shift change, midnight, or noon.

17. A tangible computer readable storage medium comprising instructions that, when executed, cause a machine to:

retrieve process control data generated in a process control system during a historical period of time having a start time set by a user, the process control data comprising alarm data associated with alarms activated during the historical period of time;

generate an alarm activation timeline for the historical period of time, the alarm activation timeline including icons representative of the alarms to visually represent a temporal relationship of activation of the alarms, one of the icons representative of an alarm that is no longer active; and store the alarm activation timeline in a database.

18. The storage medium of claim 17, wherein the instructions further cause the machine to:

generate an active alarm timeline to visually represent a temporal relationship of active alarms in the process control system based on real-time alarm data; and compare a first pattern of alarms based on the real-time alarm data to a second pattern of alarms based on the process control data for the historical period of time; and calculate a similarity between the first pattern of alarms and the second pattern of alarms.

19. The storage medium of claim 18, wherein the instructions further cause the machine to:

generate a second alarm activation timeline for a select period of time corresponding to the active alarm timeline, the second alarm activation timeline based on the real-time alarm data archived as additional process control data; and alternate between a display of the active alarm timeline and the second alarm activation timeline in response to a user request, the second alarm activation timeline representing alarms activated during the select period of time that are no longer active in addition to the active alarms represented in the active alarm timeline.

20. The storage medium of claim 17, wherein the instructions further cause the machine to:

receive a user selection of a base incremental unit of time defining a duration of minor time intervals represented on a timescale associated with the alarm activation timeline, wherein the icons representative of the alarms activated during each of the minor time intervals are grouped for display via the alarm activation timeline separate from the icons representative of the alarms activated during other ones of the minor time intervals;

determine a time span for the timescale based on the base incremental unit of time and a width of available space for the alarm activation timeline; and display the alarm activation timeline with the timescale.

* * * * *